(12) United States Patent
Sugita et al.

(10) Patent No.: US 8,402,587 B2
(45) Date of Patent: Mar. 26, 2013

(54) OPTICAL CONNECTOR CLEANING TOOL

(75) Inventors: Naoki Sugita, Tokyo (JP); Mieko Tsubamoto, Tokyo (JP); Masaaki Konishi, Tokyo (JP); Masaru Kobayashi, Tokyo (JP)

(73) Assignee: NTT Advanced Technology Corporation, Tokyo (JP)

( * ) Notice: Subject to any disclaimer, the term of this patent is extended or adjusted under 35 U.S.C. 154(b) by 211 days.

(21) Appl. No.: 12/593,911

(22) PCT Filed: Mar. 19, 2009

(86) PCT No.: PCT/JP2009/055421
§ 371 (c)(1),
(2), (4) Date: Sep. 29, 2009

(87) PCT Pub. No.: WO2009/119437
PCT Pub. Date: Oct. 1, 2009

(65) Prior Publication Data
US 2011/0047731 A1    Mar. 3, 2011

(30) Foreign Application Priority Data

Mar. 27, 2008    (WO) .................. PCT/JP2008/055944

(51) Int. Cl.
*B08B 11/00*    (2006.01)
(52) U.S. Cl. ........................................ 15/97.1; 15/210.1
(58) Field of Classification Search ............... 15/97.1, 15/210.1
See application file for complete search history.

(56) References Cited

U.S. PATENT DOCUMENTS 8,087,118 B2 *    1/2012    Fujiwara .................... 15/97.1

FOREIGN PATENT DOCUMENTS

| JP | 09-285766 A | 11/1997 |
|---|---|---|
| JP | 2001-246343 A | 9/2001 |
| JP | 2002-090576 A | 3/2002 |
| JP | 2005-017756 A | 1/2005 |
| JP | 2008-003302 A | 1/2008 |
| WO | WO 2004/073896 A | 9/2004 |
| WO | WO 2008/108278 A | 9/2008 |

* cited by examiner

*Primary Examiner* — Randall Chin
(74) *Attorney, Agent, or Firm* — Blakely, Sokoloff, Taylor & Zafman

(57) ABSTRACT

An optical connector cleaning tool includes a holder, cleaner, and cap. The holder includes, a cylindrical slider, a cylindrical body which is rotatable and movable in the axial direction with respect to the slider, and a slider return spring which biases the body forward to return the slider to the initial position. The slider has a pair of elastic pieces having guide projections. In the outer circumferential surface of the body, spiral grooves with which the guide projections engage are formed within the angular range of 360°. When the slider moves forward, the body rotates by the cam action of the guide projections and spiral grooves. The cleaner includes, a cleaning thread accommodated in a rotary pod, a supply reel, a take-up reel, and a cleaning pin, and is connected to the body.

16 Claims, 24 Drawing Sheets

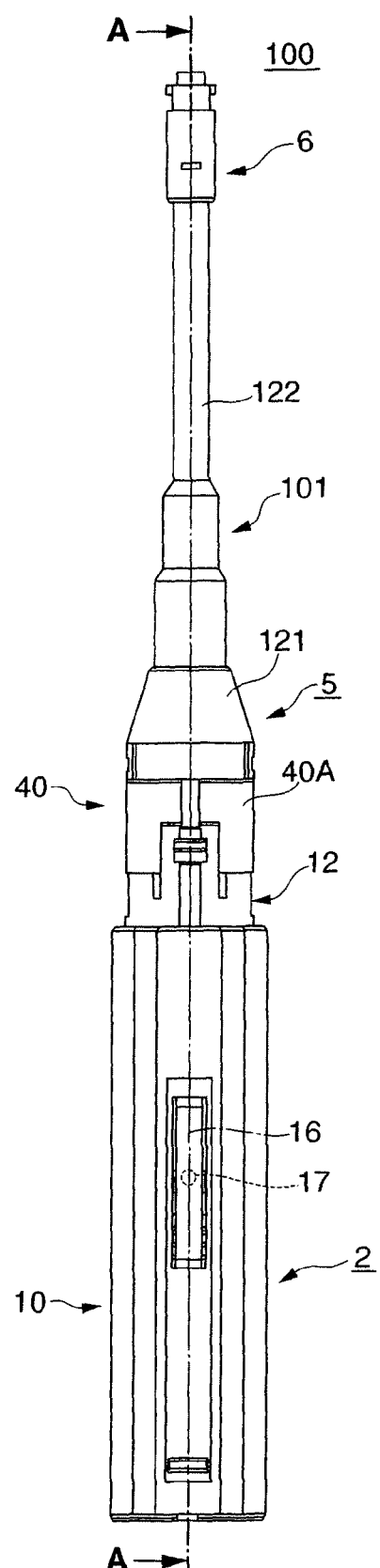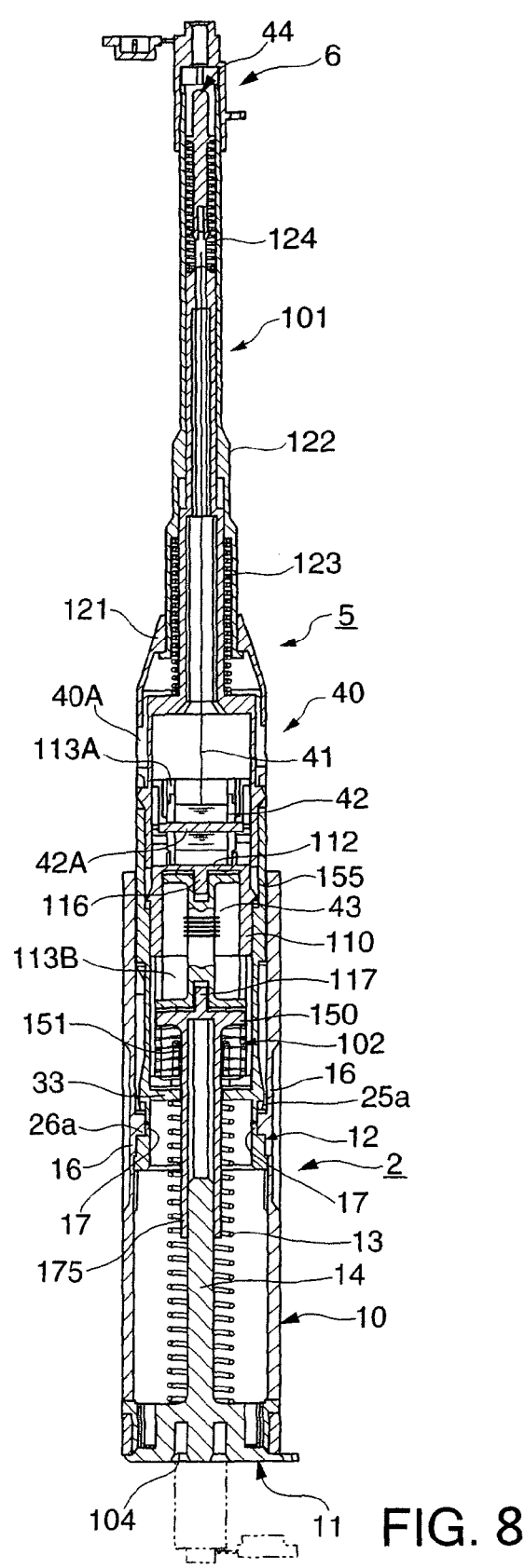

OPTICAL CONNECTOR CLEANING TOOL

This is a non-provisional application claiming the benefit of International application number PCT/JP2009/055421 filed Mar. 19, 2009.

TECHNICAL FIELD

The present invention relates to an optical connector cleaning tool to be used to clean the connection surface of an optical connector.

BACKGROUND ART

Optical connectors for use in optical communication splice optical fibers as they butt each other. If the ferrule end faces of the optical connectors, particularly, those end faces (connection surfaces) of the optical fibers which are leveled with the coupling end faces of the connectors are contaminated, or deposits such as fats and oils or dust stick to the end faces, the insertion loss of the optical connectors increases, and their return loss decreases. Since optical signals cannot normally be transmitted any longer, it is necessary to remove the contamination or deposits by cleaning the connection surfaces as needed.

Conventionally, as an optical connector cleaning tool for cleaning the connection surface of an optical connector as described above, a stick type cleaning tool C including a shaft portion A and cotton portion B as shown in FIG. 28 is used when the optical connector is a female connector because the connection surface of an optical fiber does not protrude outside a connector main body. That is, when performing cleaning by using the cleaning tool C, an operator cleans the ferrule end face as a surface to be cleaned by inserting the cotton portion B into an optical connector, bringing the cotton portion B into contact with the ferrule end face, and rotating the shaft portion A in this state.

On the other hand, when an optical connector is a male optical connector, the optical connector is cleaned by using a tape type, sheet type, or thread type cleaning tool disclosed in, e.g., Japanese Patent Laid-Open Nos. 2001-246343, 2005-17756, or 2002-090576, or WO2004/073896.

Accordingly, it is normally necessary to prepare two types of cleaning tools for male and female optical connectors in accordance with connectors. As disclosed in, e.g., Japanese Patent Laid-Open No. 9-285766, however, a combination optical connector cleaning device capable of cleaning both male and female optical connectors has also been put to practical use.

DISCLOSURE OF INVENTION

Problem that the Invention is to Solve

Unfortunately, the conventional optical connector cleaning tools disclosed in Japanese Patent Laid-Open Nos. 9-285766, 2001-246343, and 2002-090576 and WO2004/073896 all require motors, power supplies, gears, and the like, and this increases the number of parts and the cost.

The present invention has been made to solve the above-mentioned conventional problem, and has as its object to provide an optical connector cleaning tool capable of decreasing the number of parts by using a simple structure and requiring no driving source.

Means of Solving the Problem

To achieve the above object, the present invention includes a holder, and a cleaner which is rotatably attached to the holder and cleans a connection surface of an optical connector by a cleaning thread, the holder including a cylindrical slider including an elastic piece having a guide projection on a circumferential wall, a cylindrical body having, in an outer circumferential surface, a spiral groove with which the guide projection engages, and installed in the slider such that the cylindrical body is rotatable and movable forward and backward, a slider return spring which returns the slider to an initial position, and a shaft accommodated in the slider, the cleaner including a rotary pod connected to the body, a supply reel around which the cleaning thread is wound, a take-up reel which has one end connected to the shaft and takes up a used cleaning thread, and a cleaning pin which brings the cleaning tread into contact with the connection surface of the optical connector, and the cleaning pin including a thread support portion having, on a distal end face, a thread support surface which supports the cleaning thread, and protruding from the rotary pod, wherein the rotary pod gives tension to the cleaning thread by rotating together with the body during cleaning, thereby supplying an unused cleaning thread from the supply reel, and taking up a used cleaning thread to the take-up reel.

Effects of the Invention

In the present invention, when an operator holds the slider with hand, brings the distal end of the cleaning pin into contact with the connection surface (ferrule end face) of an optical connector, and moves the slider forward against the slider return spring in this state, the guide projection moves in the spiral groove and presses the groove wall, thereby converting the linear motion of the slider into the rotation of the body by the cam action. When the body rotates, the rotary pod and cleaning pin rotate together. Therefore, the cleaning thread guided to the distal end face of the cleaning pin cleans the connection surface of the optical connector. Since the distal end face of the cleaning pin is pressed against the connection surface of the optical connector, the position of the distal end face remains unchanged even when the body, rotary pod, and cleaning pin rotate, and only the slider moves forward by a predetermined distance to rotate the body, rotary pod, and cleaning pin through a predetermined angle. The rotary pod and body give tension to the cleaning thread by rotating around the supply reel and take-up reel. Accordingly, the cleaning thread is supplied from the supply reel and guided to the distal end face of the cleaning pin. After cleaning the ferrule end face, the cleaning thread is guided to the take-up reel and taken up. This makes it possible to clean the ferrule end face by an unused cleaning thread whenever performing cleaning. When the force holding the slider weakens after the cleaning of the optical connector by the cleaning thread is complete or during the cleaning, the slider moves backward and returns to the initial position by the counter-force of the slider return spring.

The spiral groove of the body and the guide projection of the slider convert the linear motion of the slider into the rotation of the body by engaging with each other. Since this obviates the need for a motor, gear mechanism, and the like, the structure is simple, and the number of parts can be reduced. This makes it possible to reduce the cost. Also, the cleaning thread does not easily break compared to a tape, and this facilitates handling the cleaning tool. Furthermore, the slider return spring biases the body in a direction to project from the slider. Therefore, the body cannot freely rotate except when the slider is in operation, so a slack of the cleaning thread can be prevented.

BRIEF DESCRIPTION OF DRAWINGS

FIG. 7 is a front view of an optical connector cleaning tool according to the second embodiment of the present invention;

FIG. 8 is a sectional view taken along a line A-A in FIG. 7;

BEST MODE FOR CARRYING OUT THE INVENTION

Figure 1:
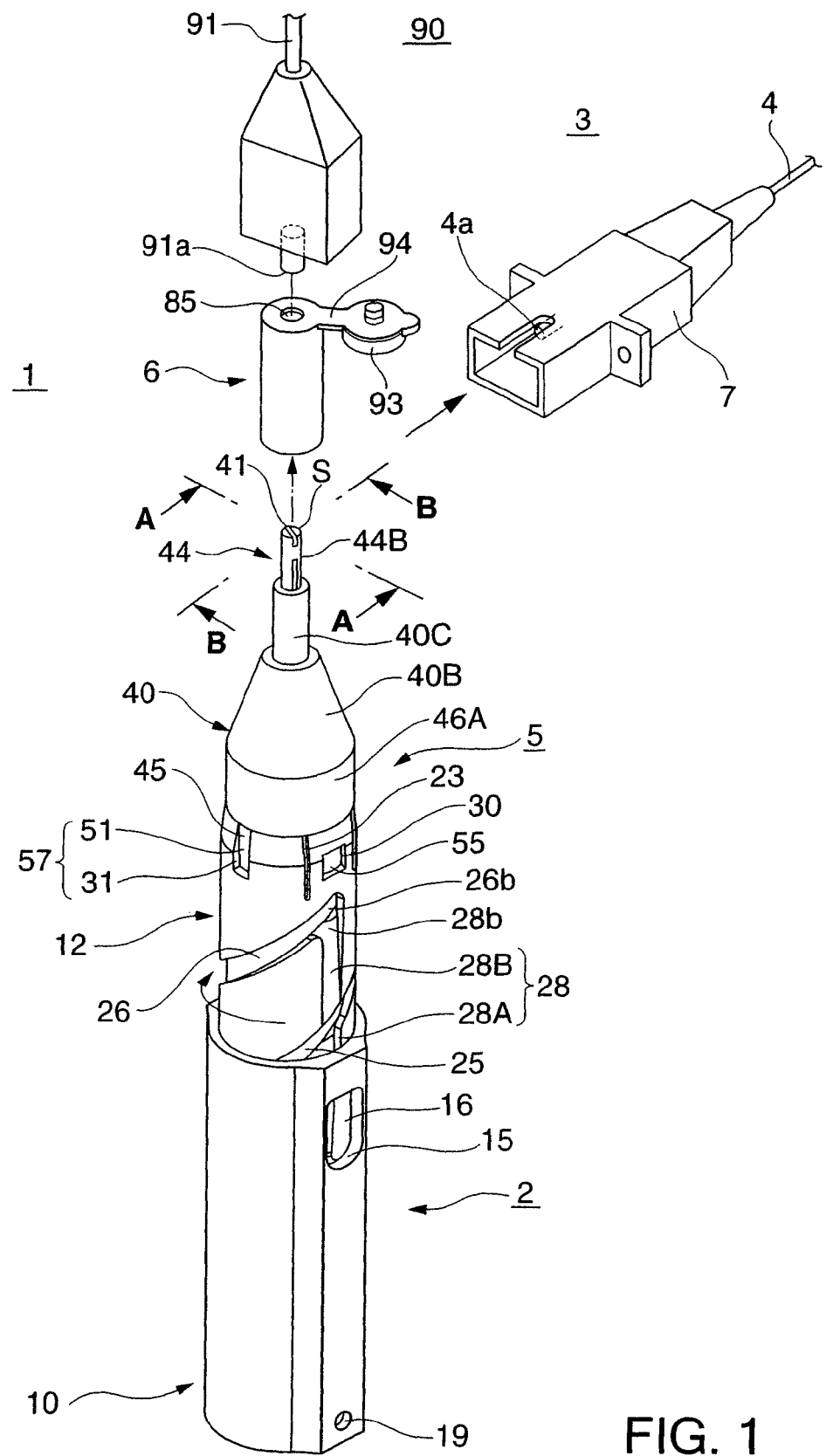
FIG. 1 is a perspective view of the outer appearance of an optical connector cleaning tool according to the first embodiment of the present invention.

The present invention will be explained in detail below based on embodiments shown in the drawings.

Referring to FIGS. 1 to 5, an optical connector cleaning tool 1 includes a holder 2, a cleaner 5 attached to the holder 2, and a cap 6 detachably attached to the distal end of the cleaner 5, and forms a cleaning tool capable of cleaning both a female connector 3 and male connector 90.

The female connector 3 integrally includes a receptacle 7 in which the male connector 90 is to be fitted, and the receptacle 7 protects an end face (connection surface) 4a of a ferrule 4.

Figure 4:
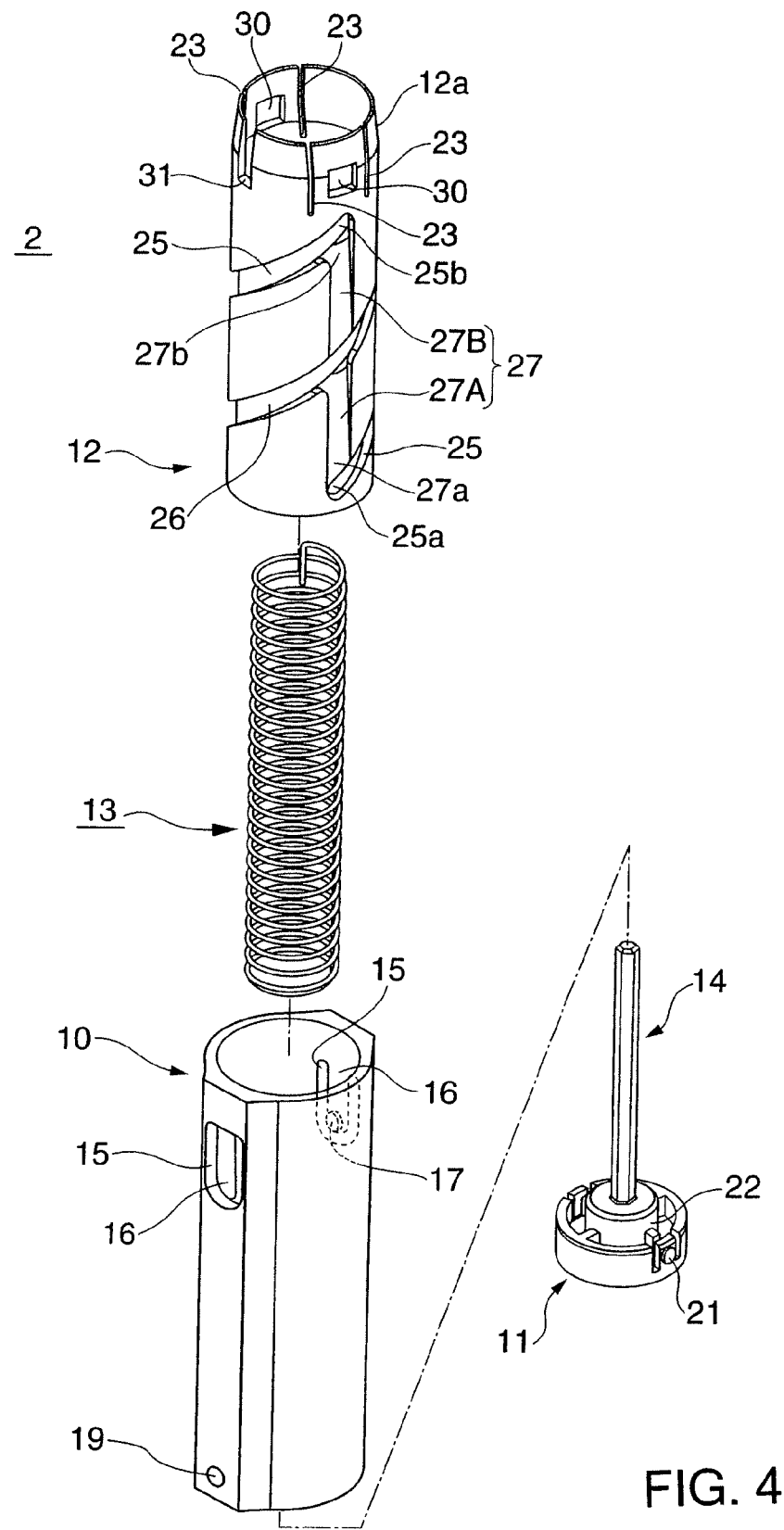
FIG. 4 is an exploded perspective view of a holder.

As shown in FIG. 4, the holder 2 includes, e.g., an almost cylindrical slider 10 having two open ends, a lid 11 that closes the rear-end opening of the slider 10, a body 12 accommodated in the slider 10, a slider return spring 13 that biases the body 12 forward to return the slider 10 to the initial position, and a shaft 14.

Figure 2:
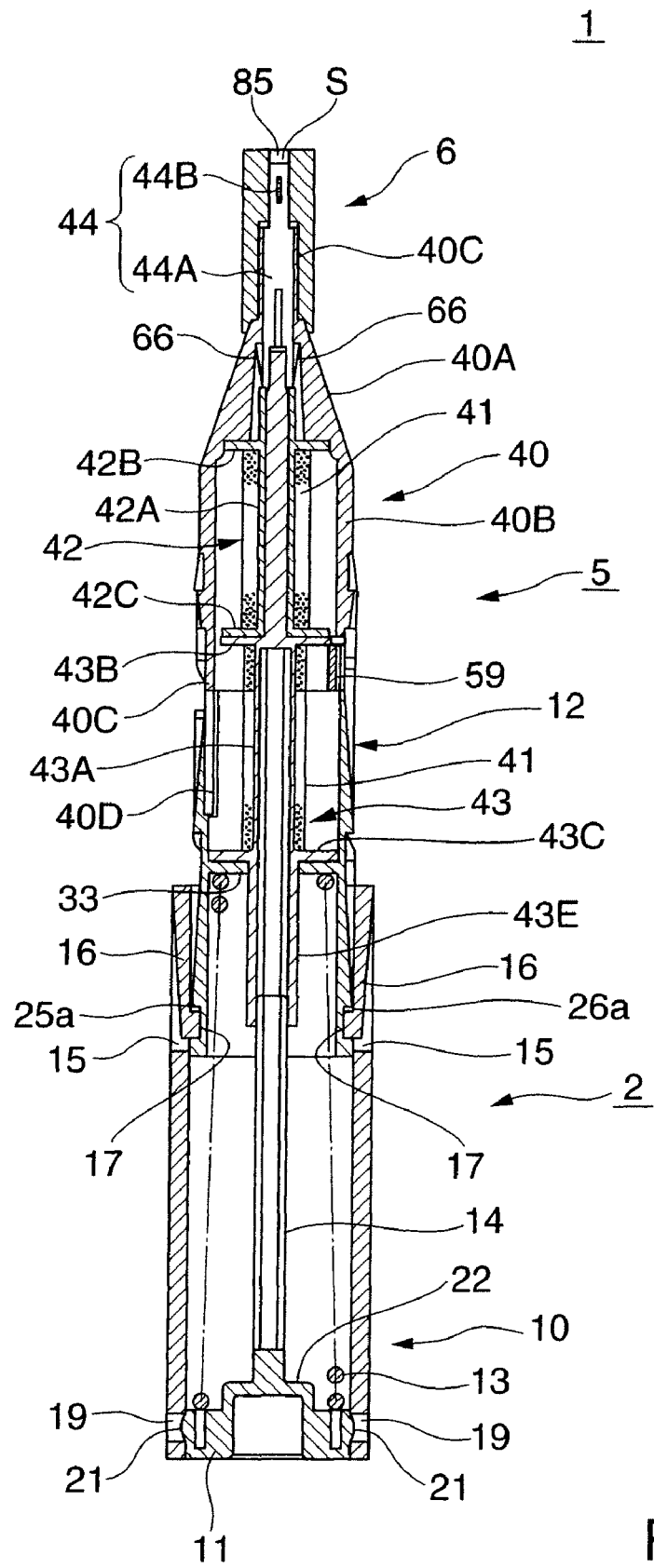
FIG. 2 is a sectional view taken along a line A-A of the optical connector cleaning tool shown in FIG. 1.

The slider 10 is a portion to be held by an operator during cleaning, and is a plastic molded product. Two elastic pieces 16 are formed back to back near the front end of the circumferential wall so as to be spaced apart by 180° in the circumferential direction. Each elastic piece 16 is formed into a tongue-like shape elongated in the axial direction of the slider 10 by a U-shaped hole 15. The front end of the elastic piece 16 is connected to the slider 10, and the rear end and two side edges of the elastic piece 16 are disconnected from the slider 10 by the U-shaped hole 15. Also, the elastic pieces 16 can elastically deform in the direction of thickness. As shown in FIG. 2, a columnar guide projection 17 is integrally formed at the distal end portion of the inner surface of each elastic piece 16. In a normal state, the guide projection 17 projects inside the slider 10. On the other hand, in the vicinity of the rear-end opening of the circumferential wall of the slider 10, two small engaging holes 19 for locking the lid 11 are formed apart by 180° in the circumferential direction.

The lid 11 is formed into a cylindrical shape having an outer diameter almost equal to the inner diameter of the slider 10. The lid 11 is fitted in the rear-end opening of the slider 10, and detachably attached to the slider 10 by engaging projections 21 formed on the outer circumferential surface with the engaging holes 19 of the slider 10. The shaft 14 integrally projects from the center of the inner surface of the lid 11 with a boss portion 22 being interposed between them. The shaft 14 has a hexagonal sectional shape, and has a distal end that extends near the front-end opening of the slider 10. Note that the sectional shape of the shaft 14 is not limited to a hexagon and can be any shape, provided that the sectional shape can prevent the rotation of a take-up reel 43 (to be described later).

Referring to FIG. 4, the body 12 is a cylindrical member formed by injection molding of a synthetic resin and having two open ends, and the outer diameter of the cylinder is slightly smaller than the inner diameter of the slider 10. The rear end portion of the body 12 is accommodated in the slider 10 so as to be rotatable and movable forward and backward. A front end portion 12a of the body 12 forms a connecting portion of a rotary pod 40 (to be described later). The outer circumferential surface forms a tapered portion inclined at a predetermined angle, and has four slits 23 that facilitate attaching the rotary pod 40 by decreasing the diameter when fitting the rotary pod 40. The slits 23 are formed to be elongated in the axial direction of the body 12, and open in the front end face of the body 12.

The outer circumferential surface of the body 12 has two spiral grooves 25 and 26 and two straight grooves 27 and 28. The spiral grooves 25 and 26 and the guide projections 17 formed on the elastic pieces 16 of the slider 10 form a rotating mechanism that rotates the cleaner 5 by converting the linear motion of the slider 10 into the rotation of the body 2. That is, the body 2 rotates when the guide projections 17 linearly move along the spiral grooves 25 and 26. Also, when the body 12 is in the initial position, the guide projections 17 are positioned at start ends 25a and 26a of the spiral grooves 25 and 26. In this state, the guide projections 17 and spiral grooves 25 and 26 form a removal preventing mechanism that prevents the removal of the body 12 from the slider 10.

The two spiral grooves 25 and 26 are formed within the angular range of 360° at an interval of 180° in the circumferential direction of the body 12. Therefore, the body 12 maximally rotates once when the slider 10 moves forward. Since the spiral grooves 25 and 26 are clockwise grooves, the body 12 rotates clockwise as the guide projections 17 push the left-side walls of the spiral grooves 25 and 26 when the slider 10 is advanced against the slider return spring 13. However, it is also possible to form counterclockwise grooves, and rotate the body 12 counterclockwise.

On the other hand, the straight grooves 27 and 28 are used as passages through which the guide projections 17 pass when the slider 10 is returned to the initial position by the slider return spring 13 after the slider 10 is moved forward by a maximum stroke. The straight grooves 27 and 28 are grooves elongated in the axial direction of the body 12, and formed apart by 180° in the circumferential direction. Of the straight grooves 27 and 28, the straight groove 27 is a straight groove connecting the start end 25a and a terminal end 25b of the spiral groove 25, and has a center that intersects and communicates with the center of the spiral groove 26. Also, the bottom surface of a groove portion 27A from a start end 27a of the straight groove 27 to the spiral groove 26 and that of a groove portion 27B from the center to a terminal end 27b of the straight groove 27 do not have any constant depth, but are formed as slopes inclined such that the depth gradually increases toward the front end of the body 2. The start ends 25a and 26a of the spiral grooves 25 and 26 are at the rear end of the body 12, and the terminal end 25b and a terminal end 26b of the spiral grooves 25 and 26 are at the front end of the body 12. Likewise, the straight groove 28 is a straight groove connecting the start end 26a and terminal end 26b of the spiral groove 26, and has a center that intersects and communicates with the center of the spiral groove 25 (see FIG. 1). Also, similar to the straight groove 27, the bottom surface of a groove portion 28A from the start end 28a of the straight groove 28 to the spiral groove 26 and that of a groove portion 28B from the center to a terminal end 28b do not have any constant depth, but are formed as slopes inclined such that the depth gradually increases toward the front end of the body 12.

The two straight grooves 27 and 28 as described above are formed and their bottom surfaces are formed as slopes in order to facilitate removing the guide projections 17 from the straight grooves 27 and 28 when removing the body 12 from the slider 10. That is, if the depth of the straight grooves 27 and 28 is constant and large, the guide projections 17 cannot be retreated from the straight grooves 27 and 28 even when moving the guide projections 17 from the spiral grooves 25 and 26 to the straight grooves 27 and 28 by rotating the body 12, because the guide projections 17 abut against the groove walls of the straight grooves 27 and 28 and this makes it impossible to elastically deform the elastic pieces 16 outward. On the other hand, when the bottom surfaces of the straight grooves 27 and 28 are formed as slopes, the guide projections 17 readily climb over the straight grooves 27 and 28 when the body 12 is rotated with the guide projections 17 being positioned in the shallowest portions of the bottom surfaces of the straight grooves 27 and 28, i.e., at the start ends 27a and 28a or in the centers of the straight grooves 27 and 28. Accordingly, the elastic pieces 16 elastically deform outward, and the guide projections 17 can retreat from the straight grooves 27 and 28. In other words, the guide projections 17 can be disengaged from the straight grooves 27 and 28. Therefore, the slider 10 and body 12 can be separated by spring out the body 12 from the slider 10 by the spring force of the slider return spring 13, or pulling out the body 12 from the slider 10 by hand. Note that when connecting the body 12 to the slider 10, it is only necessary to forcedly press the rear end of the body 12 into the slider 10 against the slider return spring 13, and elastically deform the elastic pieces 16 outward by pushing the guide projections 17 by the rear end of the body 12, thereby engaging the guide projections 17 with the spiral grooves 25 and 26.

A pair of engaging holes 30 and a long hole 31 are formed in a front end portion 12a of the body 12. The pair of engaging holes 30 are holes for detachably locking the rotary pod 40 (to be described later), and formed apart by 180° in the circumferential direction of the body 12 so as to face each other. The long hole 31 is a hole elongated in the axial direction of the body 12, and has a front end that opens in the front-end opening of the body 12.

Figure 3:
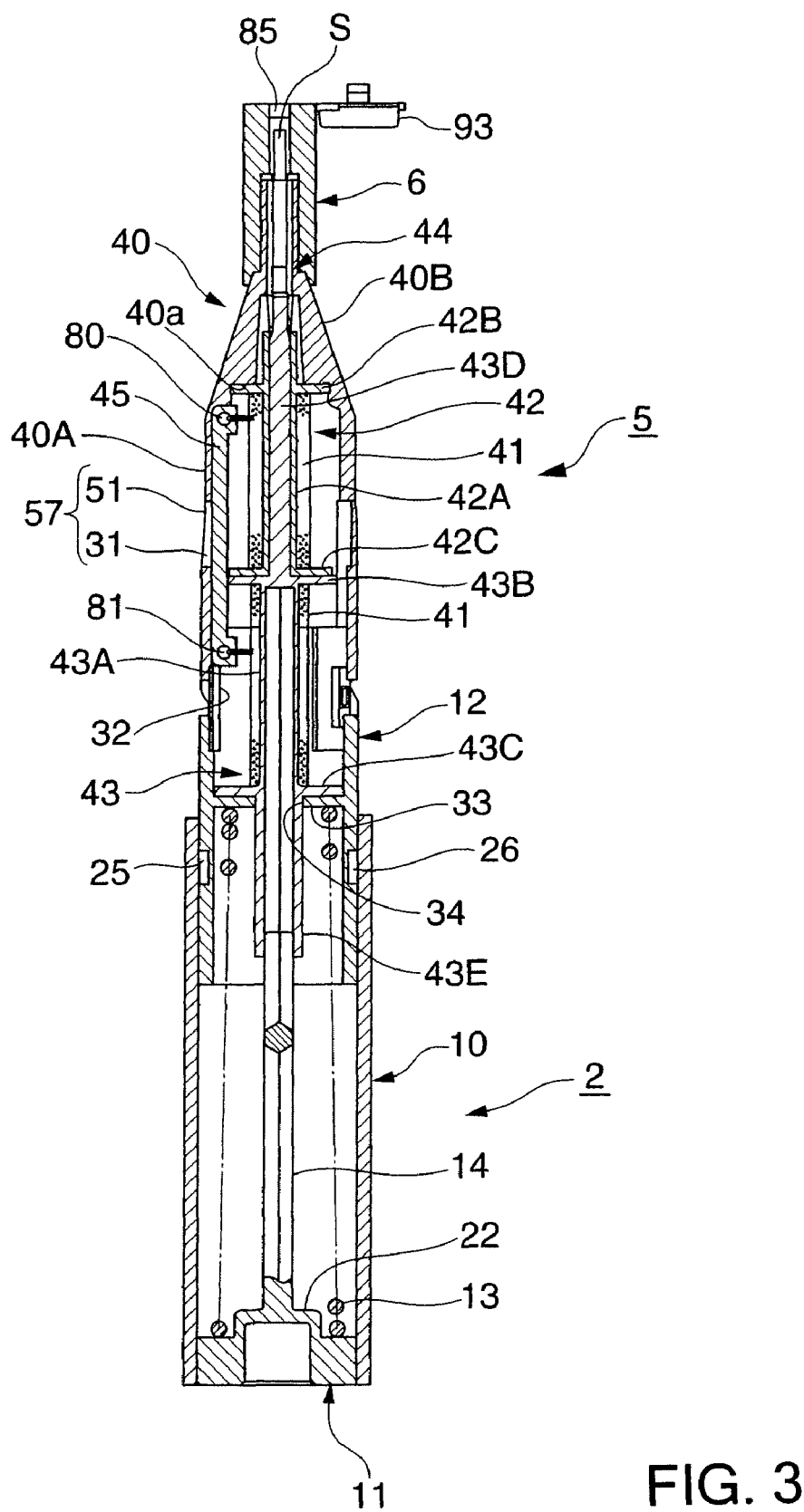
FIG. 3 is a sectional view taken along a line B-B of the optical connector cleaning tool shown in FIG. 1.

Referring to FIG. 3, the inner circumferential surface of the body 12 has a guide groove 32 and spring receiving plate 33. The guide groove 32 is formed behind the long hole 31 such that their central lines in the widthwise direction are aligned, i.e., such that the guide groove 32 and long hole 31 are formed on the same straight line. The groove width of the guide groove 32 is set larger than the hole width of the long hole 31. The spring receiving plate 33 is a circular disk formed behind the guide groove 32 and perpendicular to the axis of the body 12. The spring receiving plate 33 has, in its center, an insertion hole 34 through which a rear-end shaft 43E of the take-up reel 43 (to be described later) extends. The front end of the slider return spring 13 is in tight contact with the back surface of the spring receiving plate 33.

The slider return spring 13 is a spring that returns the slider 10 to the initial position, and biases the body 12 in a direction to protrude from the slider 10, i.e., biases the body 12 forward. The slider return spring 13 is a compression coil spring, and incorporated into the slider 10 so as to be compressed by a predetermined amount.

Figure 5:
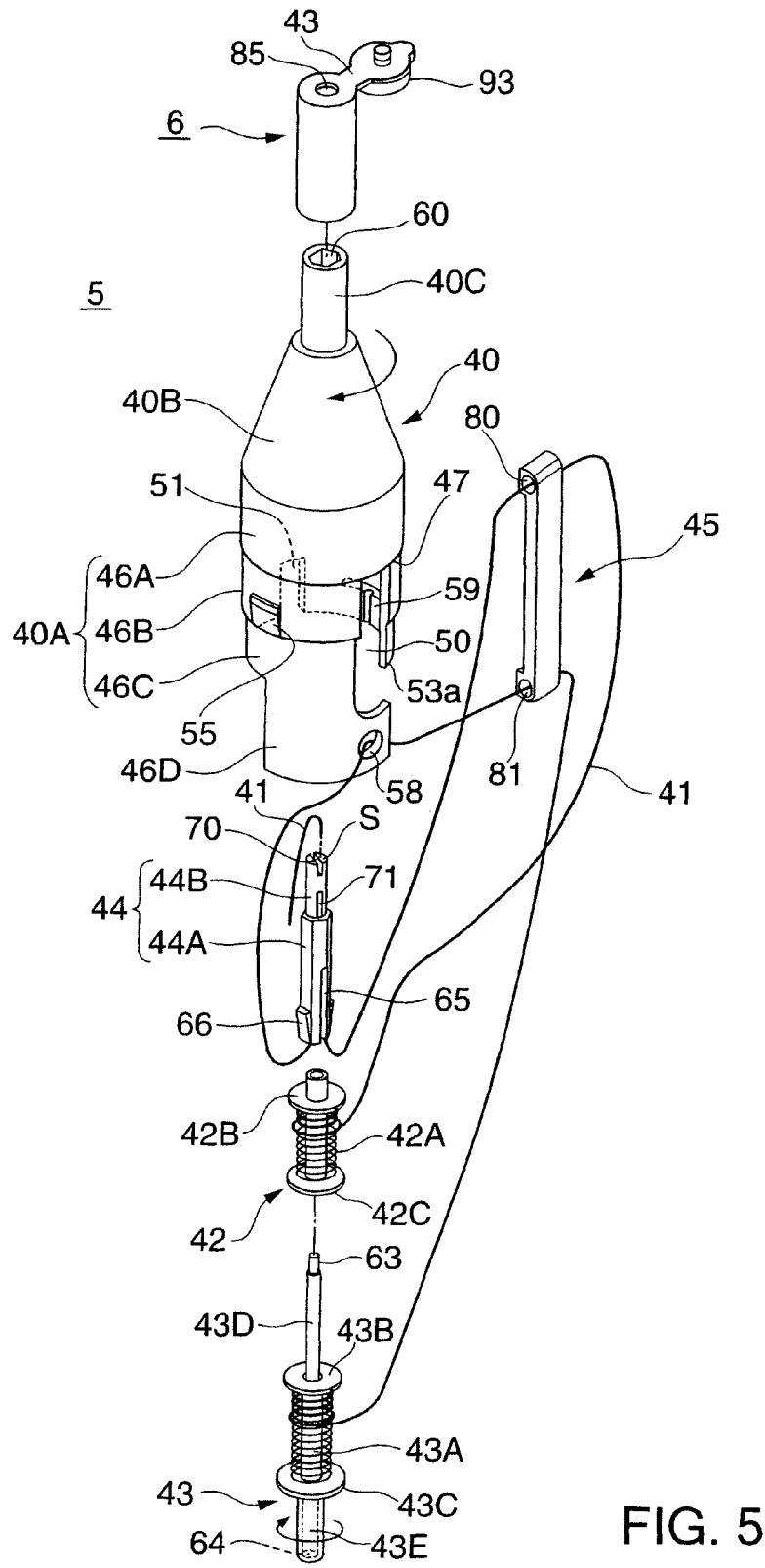
FIG. 5 is an exploded perspective view of a cleaner.

Referring to FIG. 5, the cleaner 5 includes, e.g., the rotary pod 40, a supply reel 42 accommodated in the rotary pod 40, a cleaning thread 41 wound around the supply reel 42, the take-up reel 43 for taking up the cleaning thread 41, a cleaning pin 44 that rotates together with the rotary pod 40 during cleaning, and a thread swinging member 45 that swings, in the axial direction of the take-up reel 43, a used cleaning thread 41 to be taken up to the take-up reel 43.

The rotary pod 40 is integrally formed by injection molding of a synthetic resin, and includes a cylindrical pod main body 40A having a partially notched circumferential wall, a conical portion 40B integrally connected to the front end of the pod main body 40A, and a cylindrical portion 40C integrally projecting from the front end of the conical portion 40B. The pod main body 40A is made up of three cylinders having the same inner diameter over the entire length and different outer diameters, i.e., a large-diameter cylinder 46A, medium-diameter cylinder 46B, and small-diameter cylinder 46C that decrease the diameter from the front end to the rear end. A step 47 formed in the boundary between the large-diameter cylinder 46A and medium-diameter cylinder 46B forms a contact surface that comes in contact with the distal end face of the body 12 and positions the rotary pod 40 with respect to the body 12. The medium-diameter cylinder 46B is inserted together with the small-diameter cylinder 46C into the front end portion of the body 12, and has a thread extracting hole 50 and long hole 51 spaced apart by 180° in the circumferential direction. The thread extracting hole 50 is formed to extend from the front end of the medium-diameter cylinder 46B to a rear end 53a of the small-diameter cylinder 46C, and has a rear end that opens in the rear end 53a of the small-diameter cylinder 46C. The long hole 51 forms a guide hole 57 (FIG. 3) together with the long hole 31 of the body 12. The guide hole 57 extends over the entire length of the medium-diameter cylinder 46B and small-diameter cylinder 46C, and has a rear end that opens in the rear end 53a of the small-diameter cylinder 46C. In addition, on the outer circumferential surface of the medium-diameter cylinder 46B, a pair of locking projections 55 for locking the rotary pod 40 to the body 12 are integrally formed apart by 180° in the circumferential direction. The locking projections 55 are wedge-shaped projections, and detachably connect the rotary pod 40 to the front end portion 12a of the body 12 by engaging with the engaging holes 30 (FIG. 4) of the body 12.

The small-diameter cylinder 46C is a portion to be connected together with the meddle portion 46B to the body 12, and has an extension 46D integrally extending from a part of the rear end. As shown in FIG. 5, the right end portion of the extension 46D is positioned behind the thread extracting hole 50. Also, the extension 46D has a thread insertion hole 58 into which the used cleaning thread 41 guided from the cleaning pin 44 is to be inserted. The edge of the thread insertion hole 58 forms a fulcrum for swinging the used cleaning thread 41 in the axial direction of the take-up reel 43 when winding the used cleaning thread 41 around the take-up reel 43. In addition, the small-diameter cylinder 46C has a reel locking piece 59 (FIGS. 2 and 5) for positioning the take-up reel 43 to regulate the movement in the axial direction, thereby preventing the removal of the take-up reel 43 from the rotary pod 40. The reel locking piece 59 is a cantilevered tongue-like member formed at the rear-end edge of the small-diameter cylinder 46C. A portion connecting to the small-diameter cylinder 46C forms a flexible hinge, and a free end portion is normally offset inside the small-diameter cylinder 46C. The reel locking piece 59 having this structure stops a front-side flange 43B of the take-up reel 43 (FIG. 2) from behind.

The cylindrical portion 40C of the rotary pod 40 is a portion that accommodates the cleaning pin 44 such that it cannot rotate, and protrudes a thread support portion 44B of the cleaning pin 44 forward. The cylindrical portion 40C has a hexagonal fitting hole 60 that is a through hole.

The cleaning thread 41 is, e.g., a thread formed by intertwining a large number of very thin fibers (e.g., polyester) of about 0.1 to 0.5 denier, and has a thickness almost equal to the diameter (1.25 or 2.5 mmφ) of the ferrule 4 (91) shown in FIG. 1. Also, the cleaning thread 41 is wound around the supply reel 42 such that the winding thickness is uniform in the axial direction of the reel 42. To make the winding thickness of the cleaning thread 41 uniform in the axial direction of the reel 42, the cleaning thread 41 is wound around the supply reel 42 so as to be regularly reciprocated in the axial direction of the supply reel 42. That is, after being wound from one end to the other of the supply reel 42, the cleaning thread 41 is wound from the other end to one end. The cleaning thread 41 can be wound to have a uniform thickness by repeating this operation.

The supply reel 42 includes a cylinder 42A around which the cleaning thread 41 is wound, and a pair of flanges 42B and 42C integrally formed at the two end portions of the cylinder 42A. The supply reel 42 is rotatably axially supported by a front-end shaft 43D of the take-up reel 43. When the supply reel 42 having this structure is incorporated together with the take-up reel 43 into the rotary pod 40, the front-side flange 42B abuts against an inner wall 40a (FIG. 3) of the rotary pod 40, and the rear-side flange 42C abuts against the front-side flange 43B of the take-up reel 43. This regulates the movement in the axial direction of the supply reel 42.

The take-up reel 43 includes a cylinder 43A for taking up the used cleaning thread 41, a pair of the flange 43B and a flange 43C integrally formed at the two ends of the cylinder 43A, the front-end shaft 43D extending before the flange 43B, and the rear-end shaft 43E integrally protruding from the rear end of the flange 43C. The front-end shaft 43D is inserted into the central hole of the supply reel 42, thereby rotatably axially supporting the supply reel 42. The distal end portion of the front-end shaft 43D projects before the supply reel 42, and forms a bearing 63 for rotatably axially supporting the rear end of the cleaning pin 44. The rear-end shaft 43E has an outer diameter larger than that of the front-end shaft 43D, and has a hexagonal engaging hole 64 in which the distal end portion of the shaft 14 is to be fitted. Therefore, the take-up reel 43 is detachably connected to the shaft 14 so as not to be rotatable.

Also, when the take-up reel 43 is incorporated together with the supply reel 42 and cleaning pin 44 into the rotary pod 40, the front-side flange 43B is stopped by the reel locking piece 59 (FIG. 2) of the rotary pod 40, and inhibited from removing from the rotary pod 40. When assembling the optical connector cleaning tool 1, the supply reel 42 and cleaning pin 44 are incorporated into the rotary pod 40, and the take-up reel 43 is incorporated into the body 12. After that, the medium-diameter cylinder 46B and small-diameter cylinder 46C of the rotary pod 40 are inserted into the body 12, and the engaging projections 55 are engaged with the engaging holes 30, thereby integrally connecting the rotary pod 40 and body 12. In addition, the rear end portion of the body 12 is inserted into the slider 10, the guide projections 17 are engaged with the spiral grooves 25 and 26, and the rear-end shaft 43E of the take-up reel 43 is relatively slidably fitted on the shaft 14, thereby connecting the body 12 and slider 10. In this manner, the assembly of the optical connector cleaning tool 1 is complete.

When pulling out the take-up reel 43 from the rotary pod 40, an operator can easily pull out the take-up reel 43 from the rotary pod 40 by elastically deforming the free end portion of the reel locking piece 59 outward by hand, thereby disengaging the flange 43B of the take-up reel 43 from the reel locking piece 59.

Referring to FIG. 5, the cleaning pin 44 includes a pin main body 44A and the thread support portion 44B. The pin main body 44A is a hexagonal cylinder, and fitted in the fitting hole 60 of the cylindrical portion 40C of the rotary pod 40 so that the rotation of the pin main body 44A is regulated. In the rear end portion of the pin main body 44A, two slits 65 into which the cleaning thread 41 is to be inserted are formed in the axial direction so as to be spaced apart by 180° in the circumferential direction. Also, on the rear end portion of the outer circumferential surface of the pin main body 44A, two stoppers 66 (FIG. 2) for defining that amount of the pin main body 44A which is to be inserted into the cylindrical portion 40C are integrally formed at an interval of 180° in the circumferential direction. Each stopper 66 has a wedge shape.

The thread support portion 44B of the cleaning pin 44 is formed into a columnar shape having an outer diameter (1.25 or 2.5 mmφ) almost equal to that of the ferrule 4 (91), and integrally projects from the front end of the pin main body 44A. The distal end face of the thread support portion 44B forms a thread support surface S for supporting the cleaning thread 41. A thread supporting groove 70 is formed in the center of the thread support surface S, and has two ends that open in the outer circumferential surface (side surface) of the thread support portion 44B. On the outer circumferential surface of the thread support portion 44B, a thread extracting groove 71 and thread introducing groove 72 (FIG. 6) are formed apart by 180° in the circumferential direction of the thread support portion 44B. The thread extracting groove 71 and thread introducing groove 72 have front ends positioned behind the thread supporting groove 70, and rear ends that communicate with the interior of the pin main body 44A.

The thread swinging member 45 is formed into a long and narrow plate by using a transparent material such as an acrylic resin, and slidably inserted into a guide hole 57 (FIG. 3) formed in the connecting portion of the body 12 and rotary pod 40 from inside these two members. The two ends of the thread swinging member 45 has a supply-reel-side hole 80 and take-up-reel-side hole 81 into which the cleaning thread 41 is to be inserted. The cleaning thread 41 supplied from the supply reel 42 is inserted into the supply-reel-side hole 80, and the used cleaning thread 41 passed through the thread insertion hole 58 of the rotary pod 40 is inserted into the take-up-reel-side hole 81. The cleaning thread 41 supplied from the supply reel 42 is passed through the supply-reel-side hole 80 of the thread swinging member 45, guided into the cleaning pin 44 from the slit 65 in the rear end of the cleaning pin 44, and supplied outside the cleaning pin 44 from the thread extracting groove 71. Also, the cleaning thread 41 supplied from the thread extracting groove 71 is guided into the pin main body 44 again through the thread supporting groove 70 and thread introducing groove 72 of the cleaning pin 44, and supplied outside from the rear-end opening of the pin main body 44A. The cleaning thread 41 supplied from the cleaning pin 44 is further inserted into the thread insertion hole 58 of the rotary pod 40 and the take-up-reel-side hole 81 of the thread swinging member 45, and taken up to the take-up reel 43.

Figure 6:
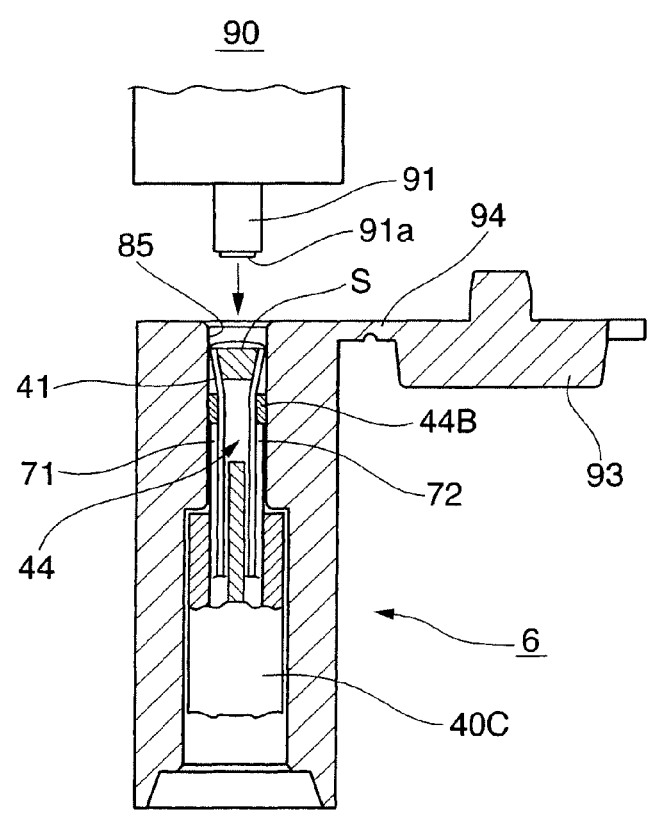
FIG. 6 is a sectional view for explaining cleaning of a male optical connector.
Figure 9:
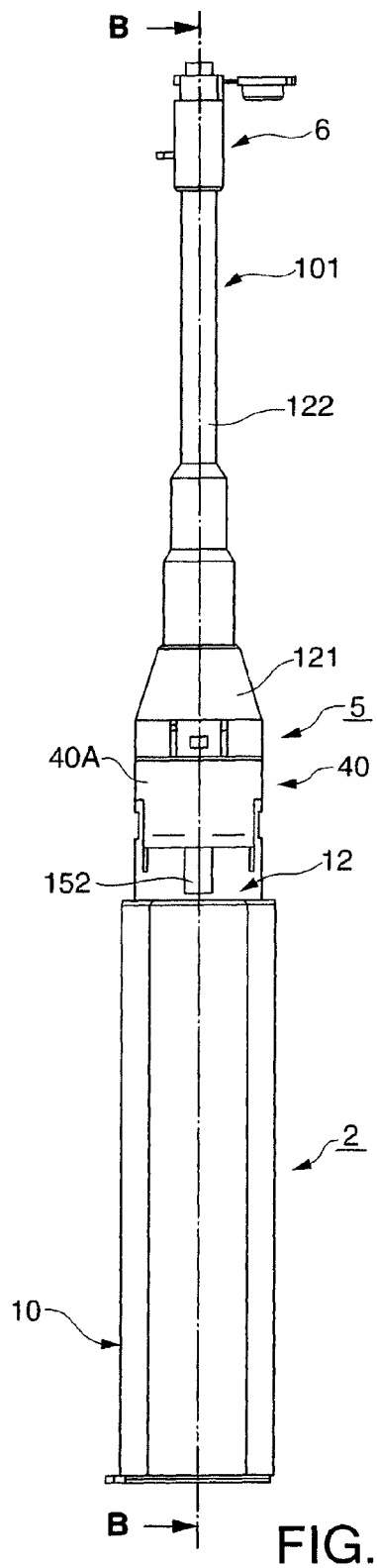
FIG. 9 is a side view of the optical connector cleaning tool.

Referring to FIG. 6, the cap 6 is formed into a cylinder having two open ends. The inner diameter of a rear end portion into which the cylindrical portion 40C of the rotary pod 40 is to be inserted is large, and that of a front end portion into which the thread support portion 44B of the cleaning pin 44 is to be inserted is small. A hole 85 in the front end of the cap 6 forms a hole into which the connecting end portion of a ferrule 91 is inserted when cleaning the male connector 90. When the optical connector cleaning tool 1 is not in use, the hole 85 is closed by a lid 93. The lid 93 is integrally connected to the front end of the cap 6 by a thin foldable hinge 94.

When assembling the holder 2 of the optical connector cleaning tool 1 having the above-mentioned structure, the lid 11 to which the shaft 14 is attached as described previously is fixed by being fitted in the rear-end opening of the slider 10, and the slider return spring 13 is accommodated in the slider 10. After that, the body 12 is incorporated into the slider 10. To incorporate the body 12 into the slider 10, the guide projections 17 are aligned with the spiral grooves 25 and 26, and the body 12 is pressed into the slider 10 against the slider return spring 13. When the body 12 is pressed into the slider 10, the rear end of the body 12 abuts against the guide projections 17, and elastically deforms the elastic pieces 16 outward. When the body 12 is further pressed into the slider 10 and the guide projections 17 are aligned with the spiral grooves 25 and 26, the elastic pieces 16 elastically return. Consequently, the guide projections 17 engage with the start ends 25a and 26a of the spiral grooves 25 and 26, thereby completing the assembly of the holder 2.

When drawing out the body 12 from the slider 10, the body 12 is pressed into the slider 10 against the slider return spring 13 as described above, thereby moving the projections 17 from the start ends 25a and 26a of the spiral grooves 25 and 26 to the start ends 27a and 28a of the straight grooves 27 and 28. In this state, the elastic pieces 16 are elastically deformed outward by rotating the body 12 through a predetermined angle, thereby drawing out the guide projections 17 from the straight grooves 27 and 28. After that, the body 12 is pulled out from the slider 10.

When attaching the cleaner 5 to the holder 2, the rotary pod 40 is fitted on the front end portion 12a of the body 12, the locking projections 55 of the rotary pod 40 are engaged with the engaging holes 30 of the body 12, and the rear-end shaft 43E of the take-up reel 43 is fitted on the shaft 14.

When used up, the cleaning thread 41 must be replaced with a new cleaning thread. In this case, it is troublesome to pass the cleaning thread 41 through the cleaning pin 44. Accordingly, it is desirable to remove the used cleaner 5 from the body 12, and replace the used cleaner 5 with a new assembled cleaner 5. When replacing the cleaner 5, it is only necessary to remove the cleaner 5 from the body 12 by disengaging the engaging projections 55 from the engaging holes 30, fit a new cleaner 5 on the front end portion 12a of the body 12 and connect them by engaging the engaging projections 55 and engaging holes 30, and connect the take-up reel 43 to the shaft 14. Therefore, the cleaner 5 can simply and easily be replaced.

When cleaning the connection surface of the female optical connector 3 by using the optical connector cleaning tool 1 as described above, an operator holds the slider 10 and inserts the thread support portion 44B of the cleaning pin 44 into the receptacle 7 to bring the cleaning thread 41 into contact with the connection surface 4a of the ferrule 4. That is, when the thread support portion 44B is inserted into the receptacle 7 and the thread support surface S of the cleaning pin 44 is pushed against the connection surface 4a of the ferrule 4, the cleaning thread 41 in the thread supporting groove 70 formed in the thread support surface S comes in contact with the connection surface 4a.

Then, the slider 10 held in this state is moved forward against the slider return spring 13. When the slider 10 is moved forward, the guide projections 17 push the groove walls on the left side in FIG. 1 of the spiral grooves 25 and 26, so the body 12 rotates clockwise in FIG. 1. That is, the spiral grooves 25 and 26 form a female screw, and the guide projections 17 form a male screw. When the slider 10 moves forward, therefore, the cam action between the guide projections 17 and spiral grooves 25 and 26 rotates the body 12. When the body 12 rotates, the rotary pod 40 also rotates together with the body 12. When the rotary pod 40 rotates, the cleaning pin 44 also rotates together with the rotary pod 40, and the cleaning thread 41 guided to the thread support surface S of the cleaning pin 44 cleans the connection surface 4a of the ferrule 4. When the slider 10 is moved forward by a maximum stroke in this state, the body 12 rotates once, and the cleaning pin 44 also rotates once. Consequently, the cleaning thread 41 cleans the whole of the connection surface 4a of the ferrule 4 once from 0° to 180° and once from 180° to 360°, i.e., cleans the connection surface 4a twice in total.

During the cleaning, the rotary pod 40 rotates around the supply reel 42 and take-up reel 43, and gives tension to the cleaning thread 41 by integrally rotating the take-up reel 43. As a consequence, an unused cleaning thread 41 wound around the supply reel 42 is forcedly supplied, and the cleaning thread 41 having cleaned the connection surface 4a is taken up to the take-up reel 43. Accordingly, it is possible to automatically supply the cleaning thread 41 from the supply reel 42 and take up the cleaning thread 41 to the take-up reel 43 by only moving the slider 10 forward, and use an unused pure cleaning thread 41 whenever performing cleaning. Furthermore, it is unnecessary to form any rotation transmitting mechanism such as a gear for transmitting rotation to the supply reel 42 and take-up reel 43. This makes it possible to simplify the structure of the cleaning tool 1 and reduce the number of parts. In addition, when moved forward by a maximum stroke or stopped halfway, the slider 10 moves backward by the counterforce of the slider return spring 13 and returns to the initial position. Therefore, the optical connector 3 can repetitively be cleaned by rotating the cleaner 5 by moving the slider 10 forward again.

Also, the spiral grooves 25 and 26 formed in the outer circumferential surface of the body 12 and the guide projections 17 formed on the slider 10 construct a rotating mechanism that converts the linear motion of the slider 10 into the rotation of the cleaner 5. Since this obviates the need for any driving device such as a motor, it is possible to simplify the structure and reduce the number of parts.

Furthermore, the optical connector cleaning tool 1 uses the thin thread 41 as a cleaning member. Since the thread 41 does not easily break compared to a tape, it is easy to handle the optical connector cleaning tool 1.

If the body 12 idles, i.e., freely rotates, the cleaning thread 41 slacks, and a dirty thread already used in cleaning is rewound. Consequently, the slack of the thread causes a jam of the thread or an operation error, or cleaning is performed by reusing the used dirty cleaning thread. To prevent these accidents, in the optical connector cleaning tool 1 according to the present invention, the slider return spring 13 biases the body 12 forward to push the spiral grooves 25 and 26 against the guide projections 17. Since this eliminates the possibility of idling of the body 12, a slack of the cleaning thread 41 can reliably be prevented.

Also, the cleaner 5 is attached to the holder 2 so as to be replaceable. After the cleaning thread 41 is used up, therefore, the holder 2 can be reused by replacing the cleaner 5 with a new cleaner 5.

Furthermore, the take-up reel 43 rotatably supports the supply reel 42 and cleaning pin 44. Since this obviates the need for any special bearing member, the number of parts can further be reduced.

In the cleaner 5, the cleaning thread 41 is extracted outside the cleaning pin 44 from inside the cleaning pin 44 through the thread feedout slit 71 and guided to the thread supporting groove 70, and guided into the cleaning pin 44 again from the thread feedin slit 72. Therefore, only a small part of the cleaning thread 41 is exposed outside from the cleaning pin 44. This makes it possible to prevent the adhesion of dust or the like to an unused thread, and protect an unused thread from being contaminated by a touch with the hand. As a result, the cleaning thread 41 can be used in a clean state.

The cleaner 5 further includes the thread swinging member 45. Accordingly, the used cleaning thread 41 can be swung in the axial direction of the take-up reel 43 and taken up to the cylinder 43A of the take-up reel 43, i.e., the cleaning thread 41 is not collectively taken up to one portion. More specifically, when the rotary pod 40 rotates during cleaning, the cleaning thread 41 wound around the supply reel 42 is supplied from it while the cleaning thread 41 is reciprocated in the axial direction of the reel 42. In other words, the cleaning thread 41 is swung in the axial direction of the supply reel 42. Therefore, the thread swinging member 45 reciprocates in the guide hole 57 formed in the connecting portion of the body 12 and rotary pod 40 by the tension of the cleaning thread 41, and the used cleaning thread 41 is wound as it is swung in the axial direction of the take-up reel 43. This prevents the cleaning thread 41 from being collectively taken up to one portion of the take-up reel 41.

In addition, the swinging member 45 is made of a transparent material. This makes it possible to externally visually check the interior of the cleaner 5, and readily confirm whether an unused cleaning thread 41 remains on the supply reel 42.

Also, in the cleaner 5, the used cleaning thread 41 extracted from the cleaning pin 44 is inserted into the thread insertion hole 58 formed in the rear end of the rotary pod 40, and the cleaning thread 41 inserted into the thread insertion hole 58 is further inserted into the take-up-reel-side hole 81 of the thread swinging member 45. After that, the cleaning thread 41 is guided to the take-up reel 43. Therefore, the used cleaning thread 41 can further reliably be swung and taken up to the take-up reel 43.

Furthermore, the cleaner 5 can protect the thread support surface S of the cleaning pin 44 against dust and the like by attaching the cap 6 to the thread support portion 44B of the cleaning pin 44. In addition, the use of the cap 6 makes it possible to clean a connection surface 91a of the male optical connector 90 as shown in FIG. 6. That is, the lid 93 is opened, and the ferrule 91 of the male optical connector 90 is inserted into the hole 85 of the cap 6, and the connection surface 91a is pushed against the thread support surface S of the cleaning pin 44. In the same manner as when cleaning the female optical connector 3, the slider 10 is moved forward against the slider return spring 13, thereby integrally rotating the rotary pod 40 and cleaning pin 44. This makes it possible to clean the connection surface 91a by the cleaning thread 41.

The second embodiment of the present invention will be explained below with reference to FIGS. 7 to 24.

An optical connector cleaning tool 100 according to this embodiment is applied to cleaning of an SC or FC type optical connector 3 (e.g., a connector defined by JIS C 5973 or 5970) in which the outer diameter of a ferrule 4 is 2.5 mm. Big differences from the optical connector cleaning tool 1 disclosed in the first embodiment described above are that the maximum rotational angle of a rotary pod 40 is 180°, and that a cleaner 5 has a guide portion 101 and thread slack preventing mechanism 102. Accordingly, arrangements different from the above-mentioned first embodiment will mainly be explained, the same reference numerals denote almost the same constituent members and portions, and a repetitive explanation will be omitted.

Referring to FIGS. 7 to 11, the optical connector cleaning tool 100 includes a holder 2, the cleaner 5, a cap 6, the guide portion 101, and the thread slack preventing mechanism 102.

Similar to the first embodiment described above, the holder 2 includes a slider 10, a lid 11 that closes the rear-end opening of the slider 10, a body 12 partially accommodated in the slider 10, a slider return spring 13, and a shaft 14.

Elastic pieces 16 of the slider 10 are thin and long plate-like pieces each having two side edges separated from the slider 10 and two ends supported by it. A guide projection 17 is integrally formed on the center of the back surface of each elastic piece 16.

An annular groove 104 into which the cap 6 is to be detachably inserted is formed in the back surface of the lid 11.

The body 12 is integrally formed by a resin material, and spiral grooves 25 and 26 and straight grooves 27 and 28 with which the guide projections 17 of the slider 10 can engage are formed in the outer circumferential surface of the body 12. Since the spiral grooves 25 and 26 are formed within the angular range of 180° in the outer circumferential surface of the slider 10, the cleaner 5 can maximally be rotated through 180° by one cleaning operation. When the slider 10 is moved forward by a maximum stroke in one cleaning operation, therefore, a cleaning thread 41 cleans the whole of a connection surface 4a of the ferrule 4 once.

The straight groove 27 has a front end that opens in the front end of the body 12, a rear end that communicates with a start end 25a of the spiral groove 25, and a middle portion that communicates with the terminal end of the spiral groove 26.

Likewise, the straight groove 28 has a front end that opens in the front end of the body 12, a rear end that communicates with a start end 26a of the spiral groove 26, and a middle portion that communicates with the terminal end of the spiral groove 25. The straight grooves 27 and 28 have first halves formed to be slightly shallower than the spiral grooves 25 and 26, and second halves formed to be deeper than the spiral grooves 25 and 26. A slope 105 (FIG. 11) that gradually lowers forward is formed in the terminal end portion of each of the straight grooves 27 and 28. When the slider 10 moves forward, the guide projections 17 move by a maximum distance from the start ends 25a and 26a to terminal ends 25b and 26b of the spiral grooves 25 and 26, move backward along the straight grooves 27 and 28, and return to the start ends 25a and 26a of the spiral grooves 25 and 26 by climbing over the slopes 105.

The cleaner 5 includes, e.g., the rotary pod 40, the cleaning thread 41, a supply reel 42, a take-up reel 43, a cleaning pin 44, and a pin biasing spring 124 that biases the cleaning pin 44 forward. The supply reel 42 and take-up reel 43 are incorporated into the rotary pod 40 as they are accommodated in a reel accommodating member 110 as a constituent member of the thread slack preventing mechanism 102 (to be described later). Also, the supply reel 42 and take-up reel 43 are accommodated in the reel accommodating member 110 such that their axes are perpendicular to each other.

Figure 10:
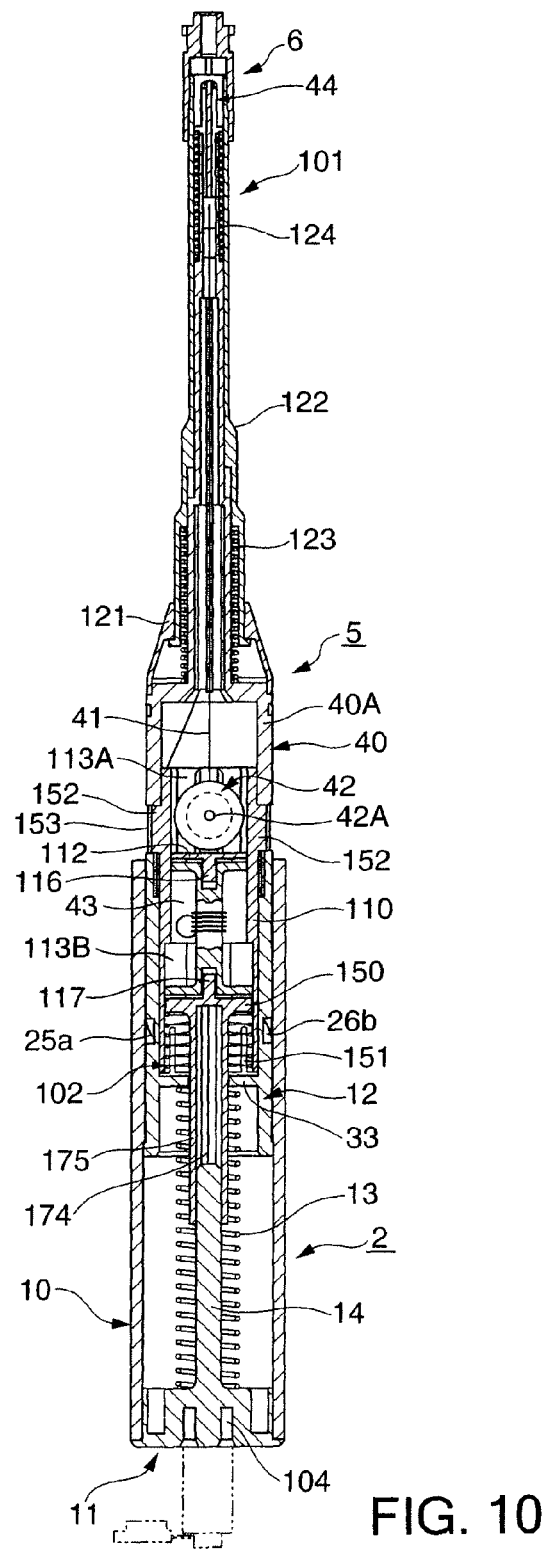
FIG. 10 is a sectional view taken along a line B-B in FIG. 9.
Figure 11:
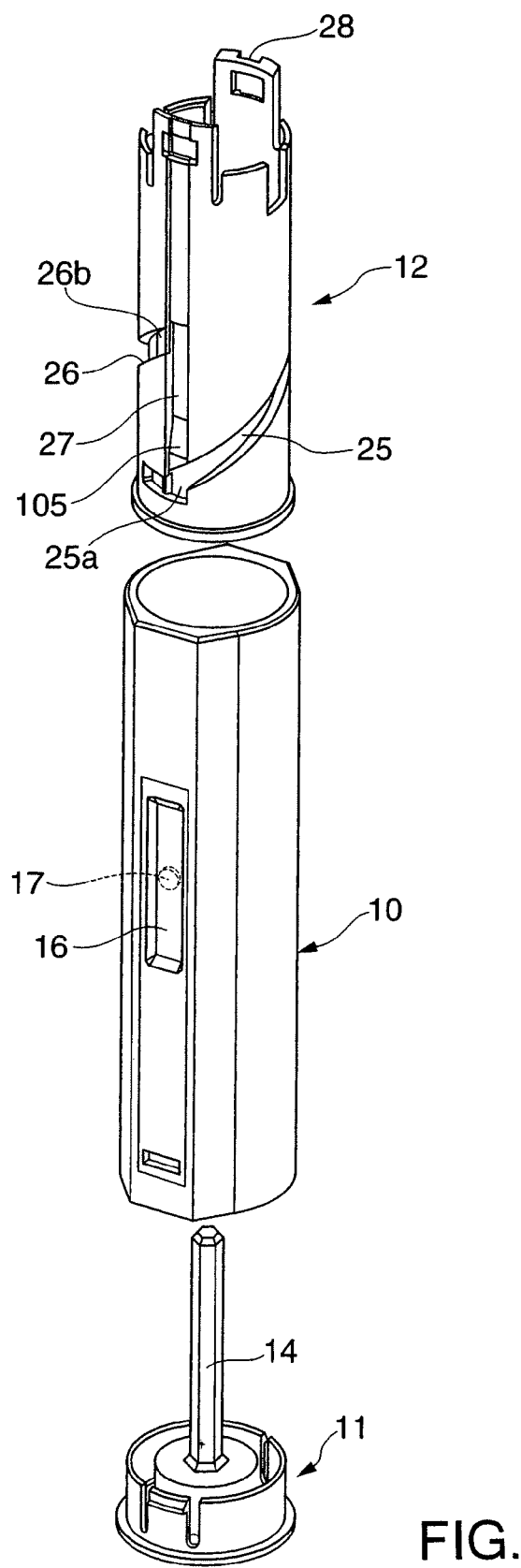
FIG. 11 is an exploded perspective view of a slider, lid, and body.
Figure 16:
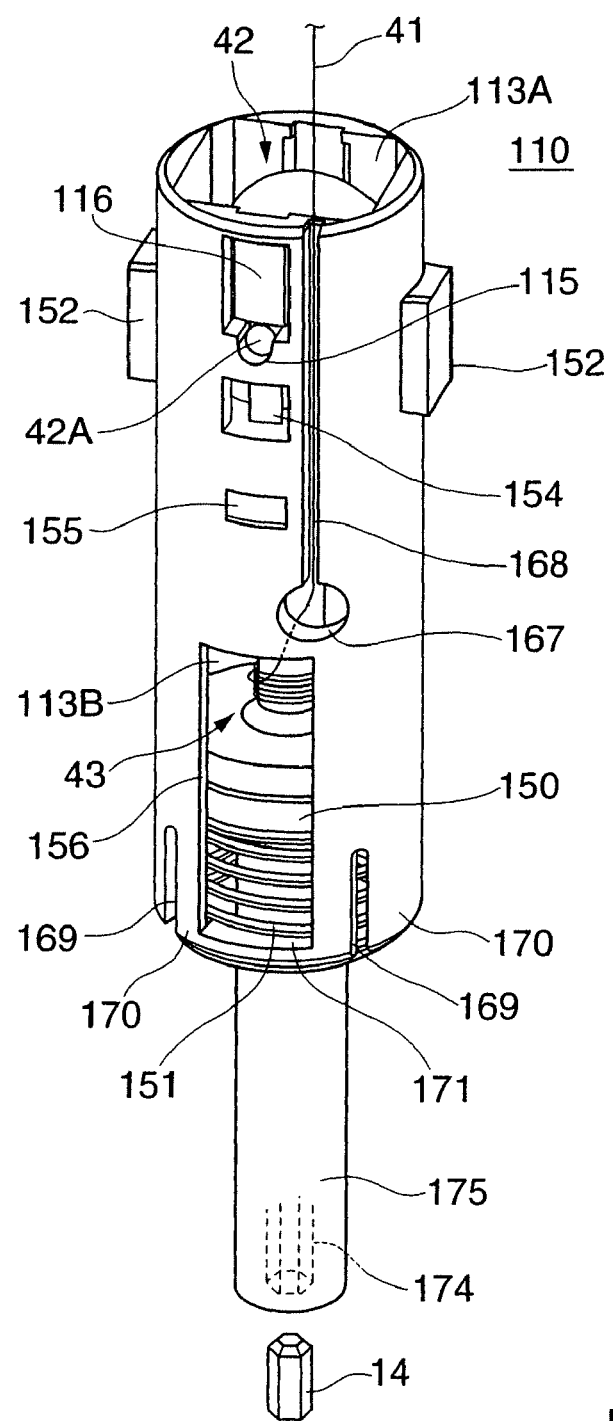
FIG. 16 is a perspective view of a clutch mechanism.
Figure 17:
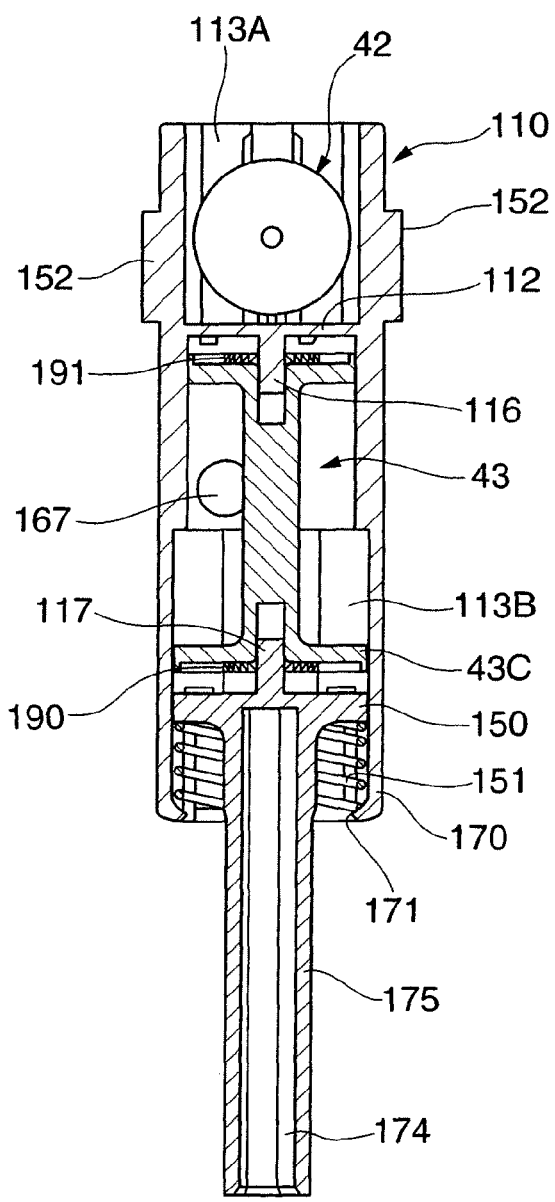
FIG. 17 is a sectional view of the clutch mechanism.
Figure 18:
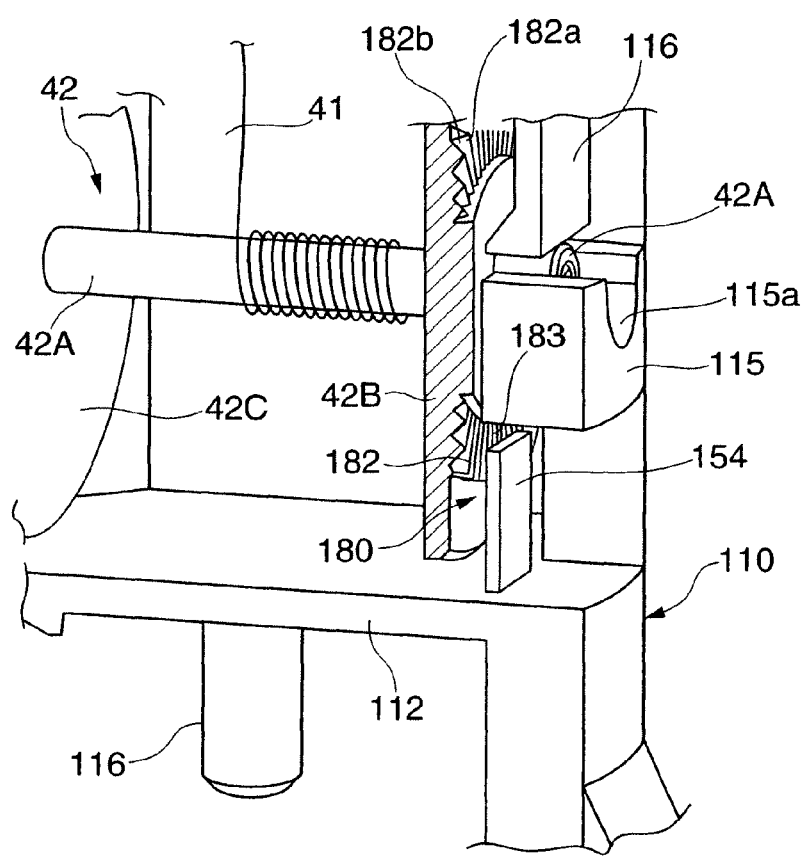
FIG. 18 is a partially cutaway perspective view of a latch mechanism.
Figure 19:
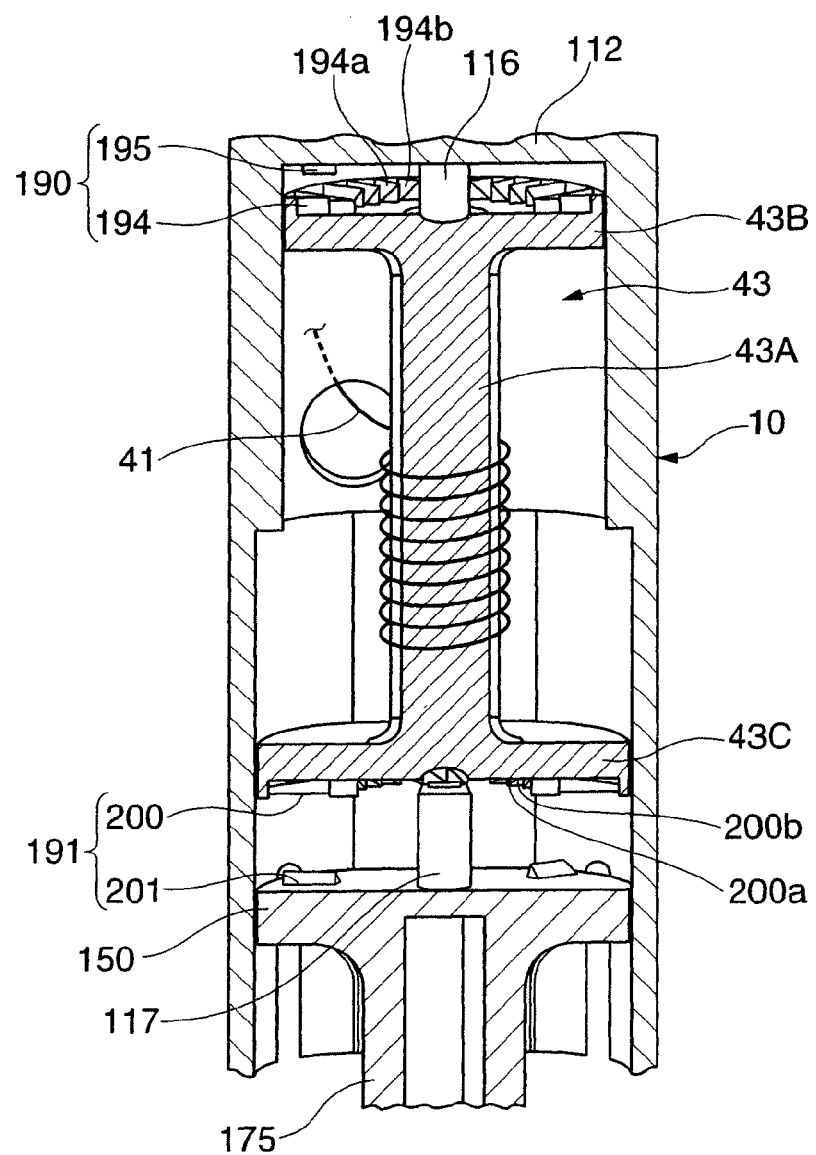
FIG. 19 is a partially cutaway perspective view of first and second unidirectional clutches.

Referring to FIGS. 16, 18, and 19, the reel accommodating member 110 is formed into a cylinder having two open ends, and partitioned into two, front and rear chambers 113A and 113B by a partition 112 (FIGS. 8 and 10). In the front chamber 113A, the supply reel 42 is accommodated with its axis being perpendicular to that of the reel accommodating member 110. In the rear chamber 113B, the take-up reel 43 is accommodated with its axis being aligned with that of the reel accommodating member 110. The end portions of a cylinder 42A of the supply reel 42 are rotatably axially supported by a pair of bearings 115 formed on the circumferential wall of the reel accommodating member 110 and each having a semicircular recess 115a. In addition, removal preventing pieces 116 inhibit the forward movement of these end portions of the cylinder 42A. The removal preventing pieces 116 are elastically deformable in the direction of thickness, and positioned before the bearings 115. When incorporating the supply reel 42 into the chamber 113A, the removal preventing pieces 116 elastically deform outward as they are pushed by the end portions of the cylinder 42A, thereby engaging the end portions of the cylinder 42A with the bearings 115. After that, the removal preventing pieces 116 elastically return to prevent removal from the bearings 115.

The take-up reel 43 is rotatably axially supported by a shaft pin 116 projecting from the partition 112 of the reel accommodating member 110, and a shaft pin 117 projecting from a clutch plate 150 (to be described later).

Figure 12:
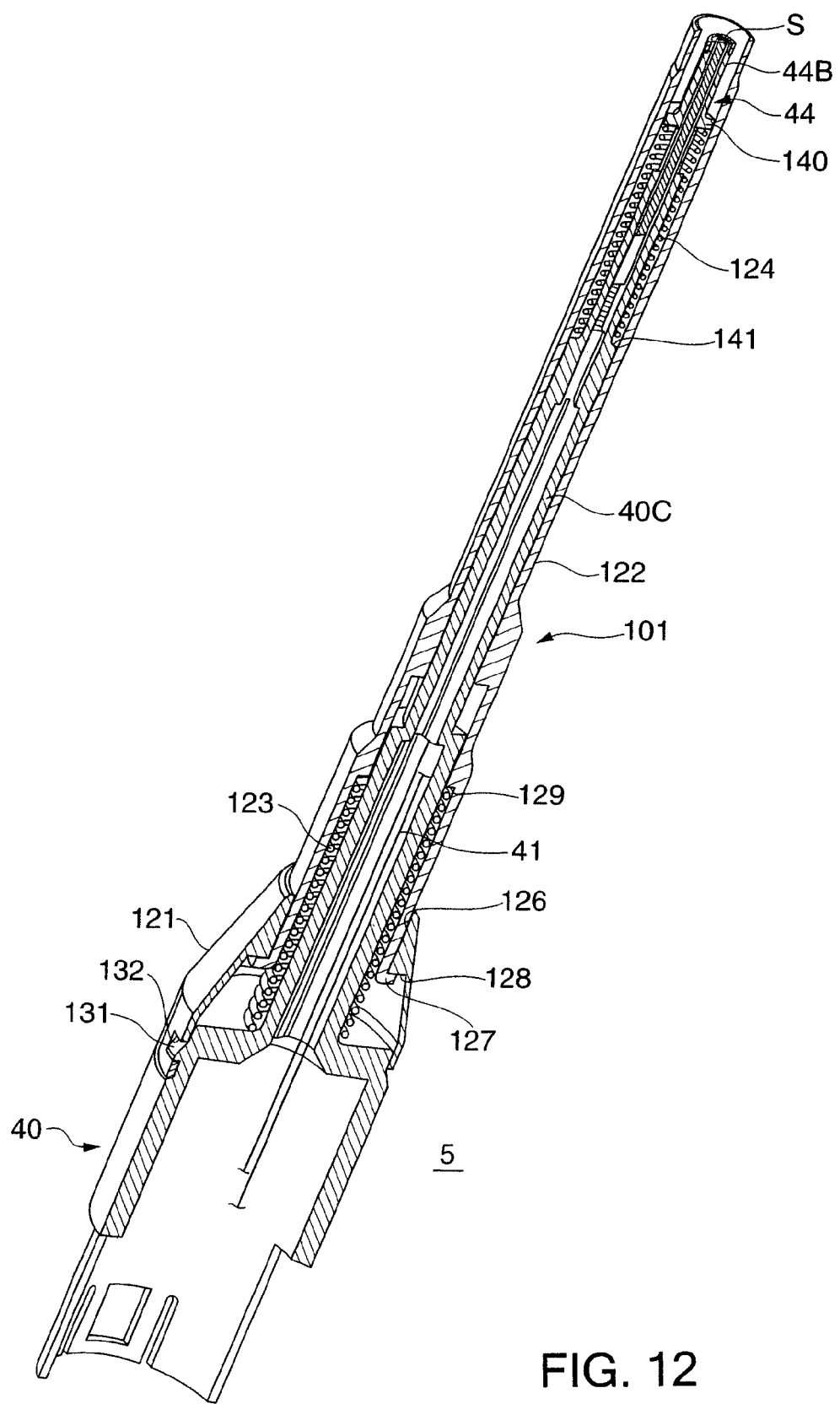
FIG. 12 is a partially cutaway perspective view of a cleaner.

Referring to FIG. 12, the guide portion 101 is formed on the outer circumferential surface of the cleaner 5. When the optical connector cleaning tool 100 is not in use, the guide portion 101 protects, together with the cap 6, a thread support portion 44B of the cleaning pin 44 and the cleaning thread 41 that are exposed outside the rotary pod 40. During cleaning, the guide portion 101 guides the distal end portion of the cleaner 5 to a receptacle 7. The guide portion 101 includes a guide lock 121 attached to the rotary pod 40, a guide member 122 that covers the outer circumferential surface of a cylindrical portion 40C of the rotary pod 40, and a guide biasing spring 123 that biases the guide member 122 forward.

The guide lock 121 is formed into a frustoconical shape, and fitted on the front surface of a pod main body 40A of the rotary pod 40. The guide lock 121 is detachably fixed by engagement of a plurality of engaging pieces 131 and a plurality of locking holes 132. The front opening of the guide lock 121 forms a straight hole 126, and the guide member 122 is slidably inserted into the hole 126.

The guide member 122 is formed into a cylindrical member, and fitted on the cylindrical portion 40C of the rotary pod 40 so as to be movable forward and backward. A flange 127 is integrally formed at the rear end of the guide member 122. The flange 127 abuts against a step 128 formed at the rear end of the hole 126, thereby preventing the removal of the guide member 122 from the guide lock 121.

The guide biasing spring 123 is elastically installed in an annular gap between the outer circumferential surface of the rear end portion of the cylindrical portion 40C of the rotary pod 40 and the inner circumferential surface of the rear end portion of the guide member 122. Since the front end is urged against a step 129 formed on the inner surface of the guide member 122 and the rear end is urged against the front surface of the main body 40A of the rotary pod 40, the guide biasing spring 123 biases the guide member 122 forward to press the flange 127 of the guide member 122 against the step 128 of the guide lock 121. In this state, the distal end of the guide member 122 is positioned before the cleaning pin 44, and surrounds the circumferential surface of the thread support portion 44B of the cleaning pin 44, which projects from the rotary pod 40. This prevents dust or the like from sticking to the cleaning thread 41 supported by a thread support surface S, or prevents an operator from touching and contaminating the cleaning thread 41 by mistake. This also prevents damage to the thread support portion 44B caused by collision against the wall surface or the like. The pin biasing spring 124 is elastically installed in an annular gap between the outer circumferential surface of the front end portion of the cylindrical portion 40C of the rotary pod 40 and the inner circumferential surface of the front end portion of the guide member 122, and biases the cleaning pin 44 forward. The front end of the pin biasing spring 124 is urged against a flange 140 formed on the cleaning pin 44, and the rear end of the pin biasing spring 124 is urged against a step 141 formed on the cylindrical portion 40C of the rotary pod 40. The spring force of the guide biasing spring 123 is set weaker than that of the slider return spring 13. Also, the spring force of the pin biasing spring 124 is set weaker than that of the guide biasing spring 123.

Figure 13:
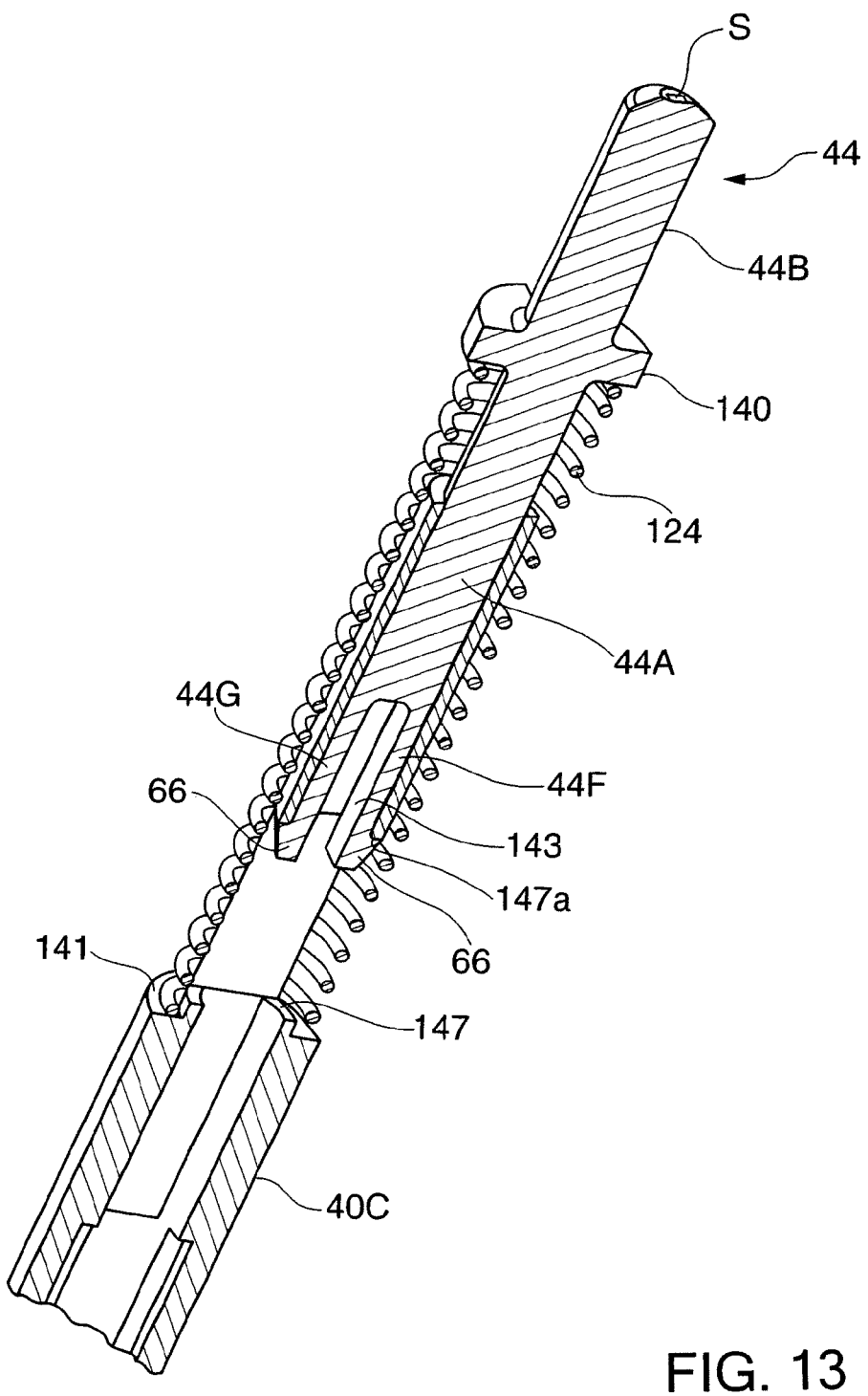
FIG. 13 is a partially cutaway perspective view of a rotary pod and cleaning pin.
Figure 14:
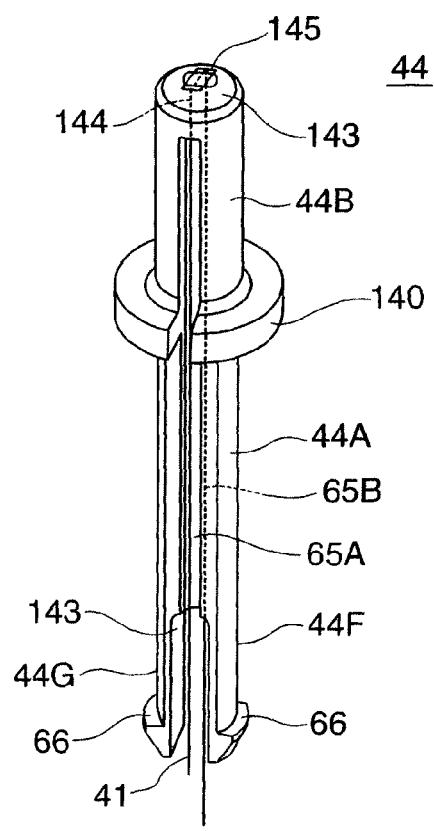
FIG. 14 is a perspective view of the cleaning pin.
Figure 15:
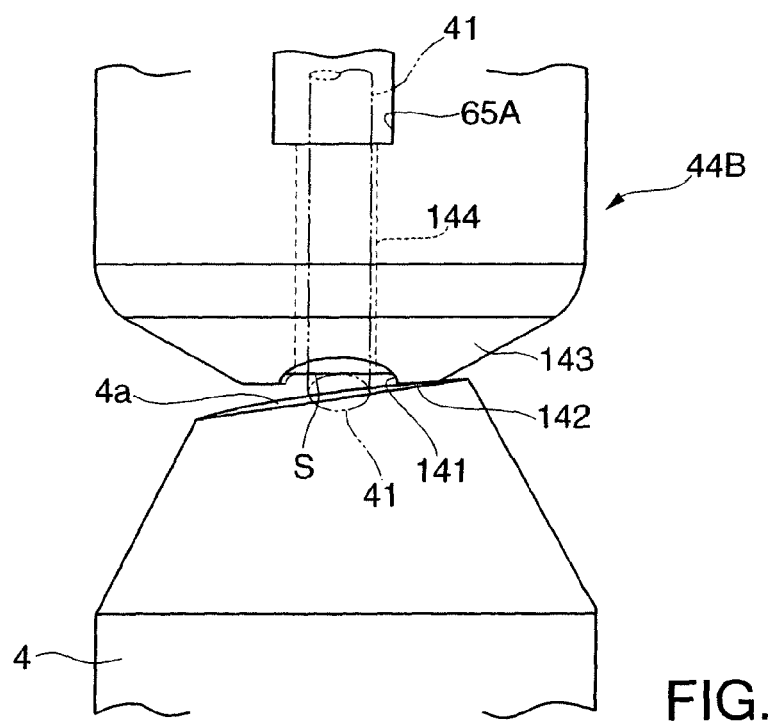
FIG. 15 is an enlarged view of the distal end portion of the cleaning pin.

Referring to FIGS. 13 to 15, the cleaning pin 44 integrally includes a columnar main body 44A, the thread support portion 44B integrally formed at the front end of the main body 44A, and the flange 140 formed in the boundary between the main body 44A and thread support portion 44B, and two thread insertion grooves 65A and 65B are formed in the outer circumferential surfaces of the main body 44A and thread support portion 44B so as to be spaced apart by 180° in the circumferential direction. The thread insertion grooves 65A and 65B are formed to have a length extending from the vicinity of the front end of the thread support portion 44B to the vicinity of the rear end of the main body 44A. Also, the rear end portion of the main body 44A is split by a slit 143 to form a pair of elastic deformation portions 44F and 44G facing each other. A stopper 66 is integrally formed at the distal end portion of the outer circumferential surface of each of the elastic deformation portions 44F and 44G. The slit 143 communicates with the thread insertion grooves 65A and 65B. When inserting the cleaning pin 44 into the cylindrical portion 40C of the rotary pod 40, the elastic deformation portions 44F and 44G elastically deform inward to make it possible to attach the cleaning pin 44 to the rotary pod 40. The stoppers 66 engage with a front end edge 147a of an opening 147 formed in the cylindrical portion 40C of the rotary pod 40, thereby positioning the cleaning pin 44 and preventing its removal from the rotary pod 40.

A distal end face 142 of the cleaning pin 44 is formed into a flat surface, a recess 141 is formed in the central portion, and the bottom surface of the groove forms the flat thread support surface S for supporting the cleaning thread 41. A thread extracting hole 144 and thread introducing hole 145 communicating with the thread insertion grooves 65A and 65B are formed on the two sides of the thread support surface S. A tapered surface 143 is formed between the outer circumferential surface of the recess 141 and the thread support portion 44B. The tapered surface 143 decreases the outer diameter of the distal end face 142. Even when the ferrule 4 is an oblique contact type ferrule, therefore, the edge of the ferrule end face 4a does not abut against the distal end face 142 as shown in FIG. 15, so the thread support surface S can approach the ferrule end face 4a. The cleaning thread 41 is guided to the thread insertion groove 65A through the rotary pod 40, and supplied forward through the thread extracting hole 144. After that, the cleaning thread 41 is inserted into the thread introducing hole 145 across the thread support surface S, and guided into the rotary pod 40 through the thread insertion groove 65B.

The thread slack preventing mechanism 102 prevents a slack and rewind of the thread caused by idling of the supply reel 42 or take-up reel 43, and ensures stable and reliable supply and take-up of the cleaning thread 41. The thread slack preventing mechanism 102 includes, e.g., the supply reel 42, the take-up reel 43, the reel accommodating member 110, the clutch plate 150, a latch mechanism 180, first and second unidirectional clutches 190 and 191, and a clutch biasing spring 151.

As described previously, the reel accommodating member 110 is formed into a cylinder having two open ends by using a resin material. The reel accommodating member 110 is fitted inside the body 12 so as not be rotatable, and rotates together with the body 12. Also, the reel accommodating member 110 has the two, front and rear chambers 113A and 113B for accommodating the supply reel 42 and take-up reel 43, and a pair of transparent windows 152 for allowing external visual check of the front chamber 113A are formed in the circumferential wall so as to be spaced apart by 180° in the circumferential direction. The transparent windows 152 are rectangular parallelopiped projections and fitted in openings 153 (FIG. 10) formed in the circumferential wall of the body 12, so the surfaces of the transparent windows 152 are exposed outside the body 12. By visually checking the supply reel 42 accommodated in the chamber 113A through the transparent windows 152, it is possible to confirm the remaining amount of an unused cleaning thread 41.

The circumferential wall of the reel accommodating member 110 has the pair of bearings 115, the pair of removal preventing pieces 116, a pair of elastic pieces 154, a pair of engaging projections 155, and a pair of openings 156 formed apart by 180° in the circumferential direction, a thread insertion hole 167, a thread insertion groove 168, and a plurality of slits 169. As described previously, the bearings 115 axially support the end portions of the cylinder 42A of the supply reel 42, and the removal preventing pieces 116 prevent the removal of the end portions from the bearings 115. The thread insertion groove 168 guides the used cleaning thread 41 to the take-up reel 43, and has a front end that opens in the front end of the reel accommodating member 110, and a rear end that communicates with the thread insertion hole 167. The slits 169 divide the rear end of the reel accommodating member 110 at predetermined intervals in the circumferential direction, thereby forming, e.g., four circular tongue pieces 170 that are elastically deformable in the direction of thickness. Of the four tongue pieces 170, spring receivers 171 integrally protrude inward from the distal ends of two tongue pieces 170 facing each other. The spring receivers 171 prevent the removal of the clutch plate biasing spring 151 from the reel accommodating member 110 by supporting the rear end of the clutch plate biasing spring 151.

The clutch plate 150 is formed into a circular disk having an outer diameter slightly smaller than the inner diameter of the reel accommodating member 110, and accommodated together with the take-up reel 43 and clutch biasing spring 151 in the rear chamber 113B of the reel accommodating member 110. When accommodating the clutch plate 150 in the rear chamber 113B, the clutch plate 150 is inserted with the tongue pieces 170 of the reel accommodating member 110 being elastically deformed outward. The shaft pin 117 for rotatably axially supporting the rear end of the take-up reel 43 integrally projects from the center of the front surface of the clutch plate 150, and a cylinder 175 having a hexagonal hole 174 integrally projects from the center of the back surface. The cylinder 175 is inserted into the slider 10 through a partition 33 (FIGS. 8 and 10) formed inside the body 12, and slidably fitted on the shaft 14. The clutch biasing spring 151 is accommodated together with the take-up reel 43 in the rear chamber 113B of the reel accommodating member 110. The front end is urged against the back surface of the clutch plate 150, and the rear end is stopped by the spring receivers 171 of the reel accommodating member 110. Thus, the clutch biasing spring 151 pushes the clutch plate 150 against the take-up reel 43 via the second unidirectional clutch 191, and pushes the take-up reel 43 against the first unidirectional clutch 190.

Referring to FIG. 18, the latch mechanism 180 prevents idling of the supply reel 42, and includes a serrated portion 182 radially formed over the entire outer circumferential surface of each of flanges 42B and 42C of the supply reel 42, and a projection 183 formed on the elastic piece 154. The serrated portion 182 have projections 182a and recesses 182b having a triangular shape that increases the width from the center to the periphery of the flange 42B or 42C, and has two sides having the same inclination angle. The elastic piece 154 integrally projects from the partition 112 of the reel accommodating member 110, and the projection 183 is integrally formed on a surface facing the supply reel 42. The projection 183 is a triangle having the same size as that of the projections 182a and recesses 182b, has a narrow distal end, and increases the width toward the rear end. The projection 183 brakes the supply reel 42 by engaging with the recess 182b.

The latch mechanism 180 including the serrated portion 182 and projection 183 as described above can reliably prevent a slack of the cleaning thread 41 wound around the supply reel 42. That is, when the slider 10 is moved forward to integrally rotate the body 12, reel accommodating member 110, supply reel 42, and take-up reel 43 during cleaning, tension is given to the cleaning thread 41, so the cleaning thread 41 wound around the supply reel 42 is supplied, and the cleaning thread 41 used in cleaning is taken up to the take-up reel 43. The supply reel 42 rotates by the tension of the cleaning thread 41 but does not idle because the projection 183 sequentially climbs over the serrated portion 182, thereby holding the tension of the cleaning thread 41 almost constant, and smoothly feeding it. Accordingly, the cleaning thread 41 does not slack.

When one cleaning operation is complete by moving the slider 10 forward by a maximum stroke, the body 12 and reel accommodating member 110 stop. Therefore, the projection 183 keeps engaging with the serrated portion 182, and prevents idling of the supply reel 42. This makes it possible to hold the tension of the cleaning thread 41 constant and prevent a slack of the cleaning thread 41 in this case as well. When one cleaning operation is complete, the guide projections 17 of the slider 10 return to the initial positions through the straight grooves 27 and 28 as described earlier. In this state, the body 12 and reel accommodating member 110 do not rotate, and the projection 183 keeps engaging with the serrated portion 182. Accordingly, the supply reel 42 holds the tension of the cleaning thread 41 constant and prevents a slack of the cleaning thread 41.

Referring to FIG. 19, the first unidirectional clutch 190 is turned on to transmit the rotation of the reel accommodating member 110 to the take-up reel 43 when the slider 10 moves forward, and turned off to interrupt the transmission of the rotation to the take-up reel 43 when the reel accommodating member 110 rotates in the opposite direction. The first unidirectional clutch 190 includes a serrated portion 194 formed on the outer surface of the flange 43B on the front side of the take-up reel 43, and projections 195 formed on the partition 112 of the reel accommodating member 110. The serrated portion 194 has projections 194a and recesses 194b having a right-angled triangular shape that increases the width from the center to the periphery of the flange 43B. The projection 194a is formed into a sawtooth shape; a surface facing the rotational direction (the clockwise direction in FIG. 19) when the cleaning thread 41 is taken up is a vertical surface, and a surface opposite to the rotational direction is a slope. The projections 195 have the same shape as that of the projections 194a and recesses 194b. For example, three projections 195 are formed at equal intervals in the circumferential direction of the partition 112, and mesh with the serrated portion 194. During cleaning, therefore, the first unidirectional clutch 190 can reliably transmit the rotation of the reel accommodating member 110 to the take-up reel 43, and take up the cleaning thread 41. That is, when the body 12 is rotated by moving the slider 10 forward during cleaning, the reel accommodating member 110 rotates together with the body 12 in FIG. 19. In this state, the serrated portion 194 and projections 195 keep engaging with each other. Accordingly, the rotation of the reel accommodating member 110 is transmitted to the take-up reel 43 via the first unidirectional clutch 190, thereby rotating the take-up reel 43 in the take-up direction. Consequently, the cleaning thread 41 is given tension and taken up to the take-up reel 43. On the other hand, when the reel accommodating member 110 reversely rotates, the projections 195 climb over the serrated portion 194. Therefore, the rotation of the reel accommodating member 110 is not transmitted to the take-up reel 43.

The second unidirectional clutch 191 is turned on to transmit the rotation of the clutch plate 150 to the take-up reel 43 when the slider 10 moves backward, and turned off to interrupt the transmission of the rotation to the take-up reel 43 when the slider 10 moves forward. The second unidirectional clutch 191 includes a sawtooth-shaped serrated portion 200 formed on the outer surface of the flange 43C on the rear side of the take-up reel 43, and projections 201 formed on the front surface of the clutch plate 150. The serrated portion 200 has projections 200a and recesses 200b having a right-angled triangular shape that increases the width from the center to the periphery of the flange 43C. The projection 200a is formed to have a right-angled triangular sectional shape; a surface facing the rotational direction (the clockwise direction in FIG. 19) when the cleaning thread 41 is taken up is a slope, and a surface opposite to the rotational direction is a vertical surface. That is, the serrated portion 200 of the second unidirectional clutch 191 has the same shape as that of the serrated portion 194 of the first unidirectional clutch 190, but the direction of the shape is reversed. The projections 201 of the clutch plate 150 have the same shape as that of the projections 200a and recesses 200b, and three projections 201 are formed at equal intervals in the circumferential direction of the clutch plate 150.

The second unidirectional clutch 191 can prevent a slack of the cleaning thread 41 especially when the slider 10 is returned to the initial position by interrupting a cleaning operation halfway after it is started. That is, when the cleaning operation is interrupted halfway without moving the slider 10 forward by a maximum stroke, the guide projections 17 return to the initial positions through the spiral grooves 25 and 26 as described previously. This rotates the body 12, reel accommodating member 110, take-up reel 43, clutch plate 150, and the like in the direction opposite to that during cleaning. Since the first unidirectional clutch 190 is OFF in this state, the take-up reel 43 may idle and slack the cleaning thread 41. In this state, the second unidirectional clutch 191 is ON and hence transmits rotation to the reel accommodating member 110. Accordingly, the take-up reel 43 does not idle and keeps giving tension to the cleaning thread 41, thereby preventing a slack of the cleaning thread 41.

The operations of the cleaner 5 and guide portion 101 when cleaning the ferrule end face of an SC type optical connector by using the optical connector cleaning tool 100 having the structure as described above will be explained below with reference to FIGS. 12 and 20 to 24.

Figure 20:
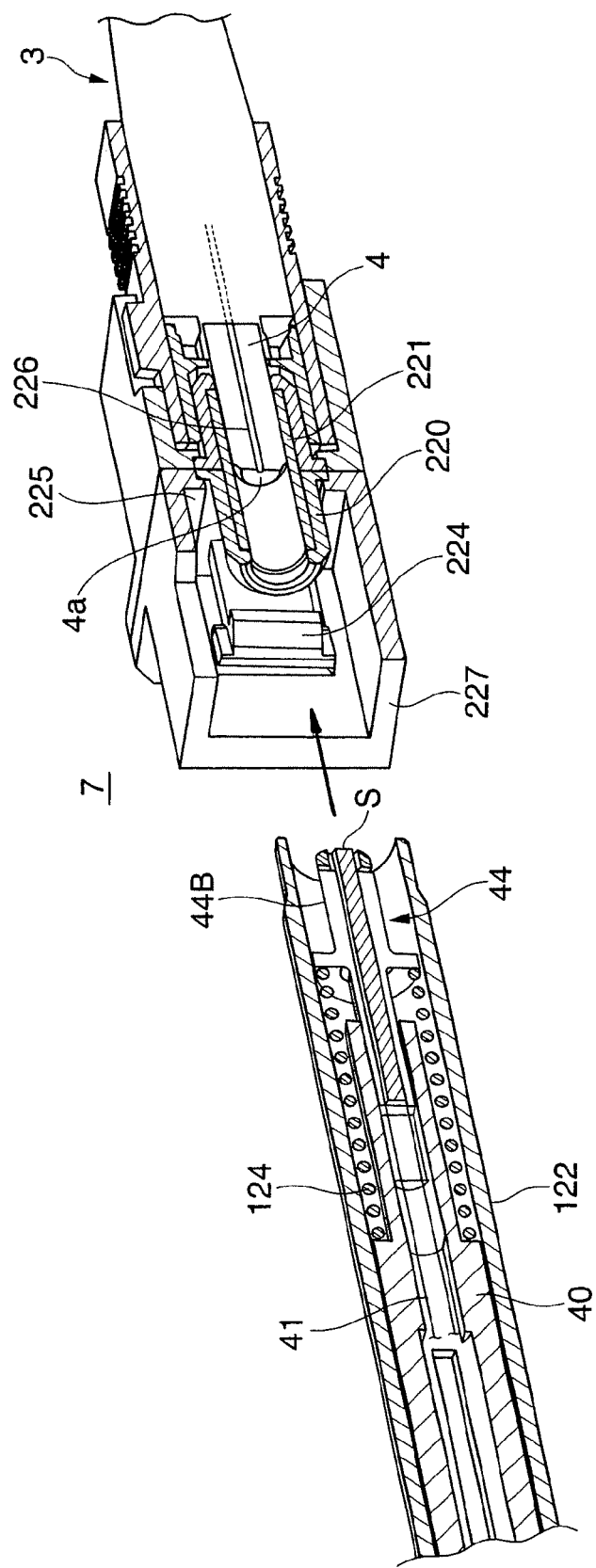
FIG. 20 is a sectional view for explaining the operations of the cleaner and a guide unit, and shows the initial state.
Figure 21:
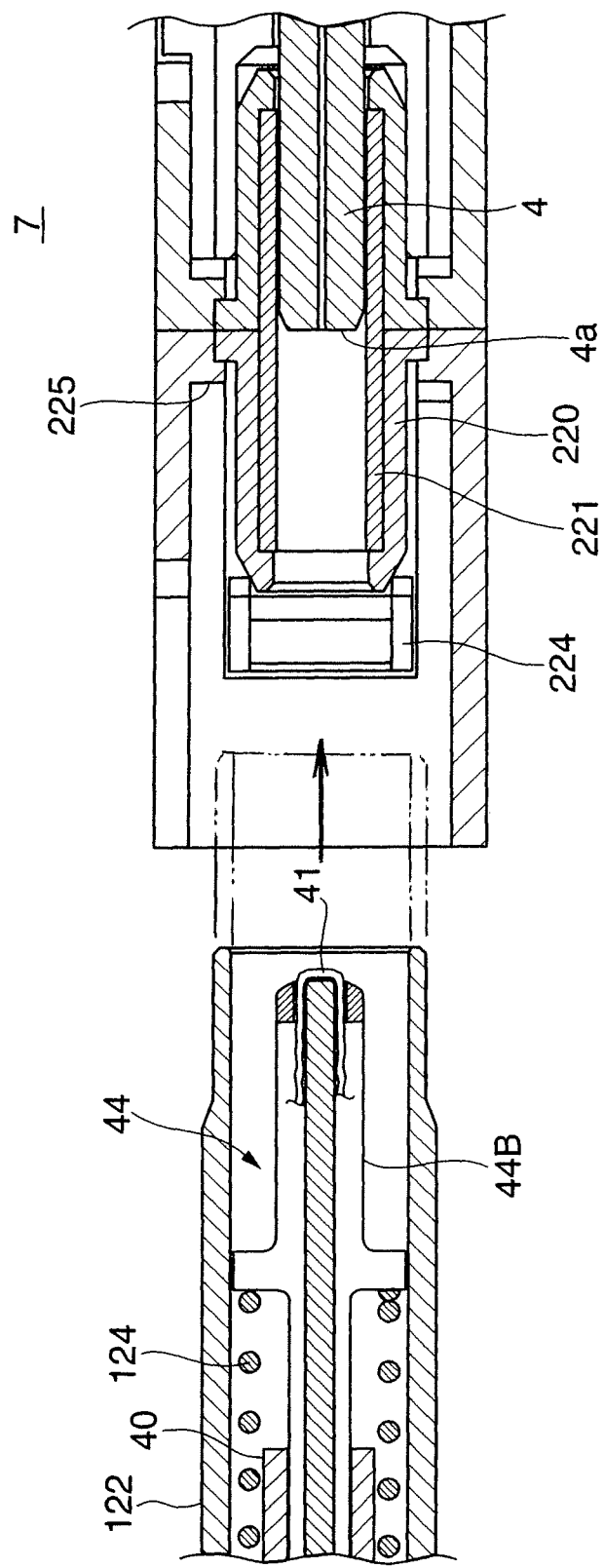
FIG. 21 is a sectional view showing a state before the cleaner is inserted into a receptacle.

FIGS. 12, 20 and 21 illustrate a state before the optical connector cleaning tool 100 is inserted into the receptacle 7. A sleeve holder 220, a sleeve 221, and a pair of locking pieces 224 are formed in the receptacle 7. The sleeve holder 220 has an outer diameter slightly smaller than the inner diameter of the distal end portion of the guide member 122. The sleeve 221 positions the ferrule 4 with respect to the sleeve holder 220, and is installed inside the sleeve holder 220. The inner diameter of the sleeve 221 is almost equal to the outer diameter of the ferrule 4, and slightly larger than the outer diameter of the thread support portion 44B of the cleaning pin 44. The pair of locking pieces 224 clamp the distal end portion of the guide member 122, and fix the distal end portion to the receptacle 7. The pair of locking pieces 224 face each other with the sleeve holder 220 being interposed between them. Reference numeral 225 denotes the inner wall of the receptacle 7; 226, an optical fiber; and 227, a housing.

In the state (FIGS. 20 and 21) before the optical connector cleaning tool 100 is inserted into the receptacle 7, the guide member 122 is positioned on the front side by the spring force of the guide biasing spring 123, and covers the thread support portion 44B of the cleaning pin 44. The distal end of the cleaning pin 44 is behind the distal end of the guide member 122 by 0.8 mm (2.55 mm when the diameter is 1.25 mm).

Figure 22:
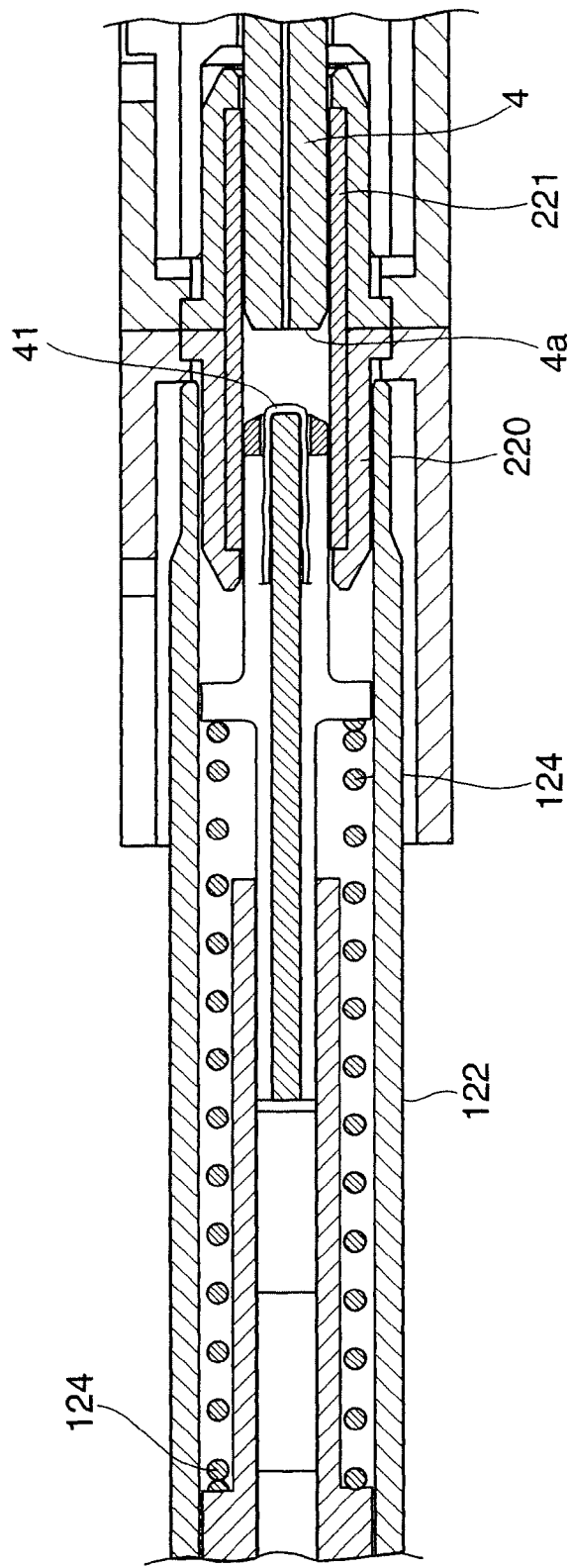
FIG. 22 is a sectional view showing a state in which the cleaner is inserted into the receptacle.
Figure 23:
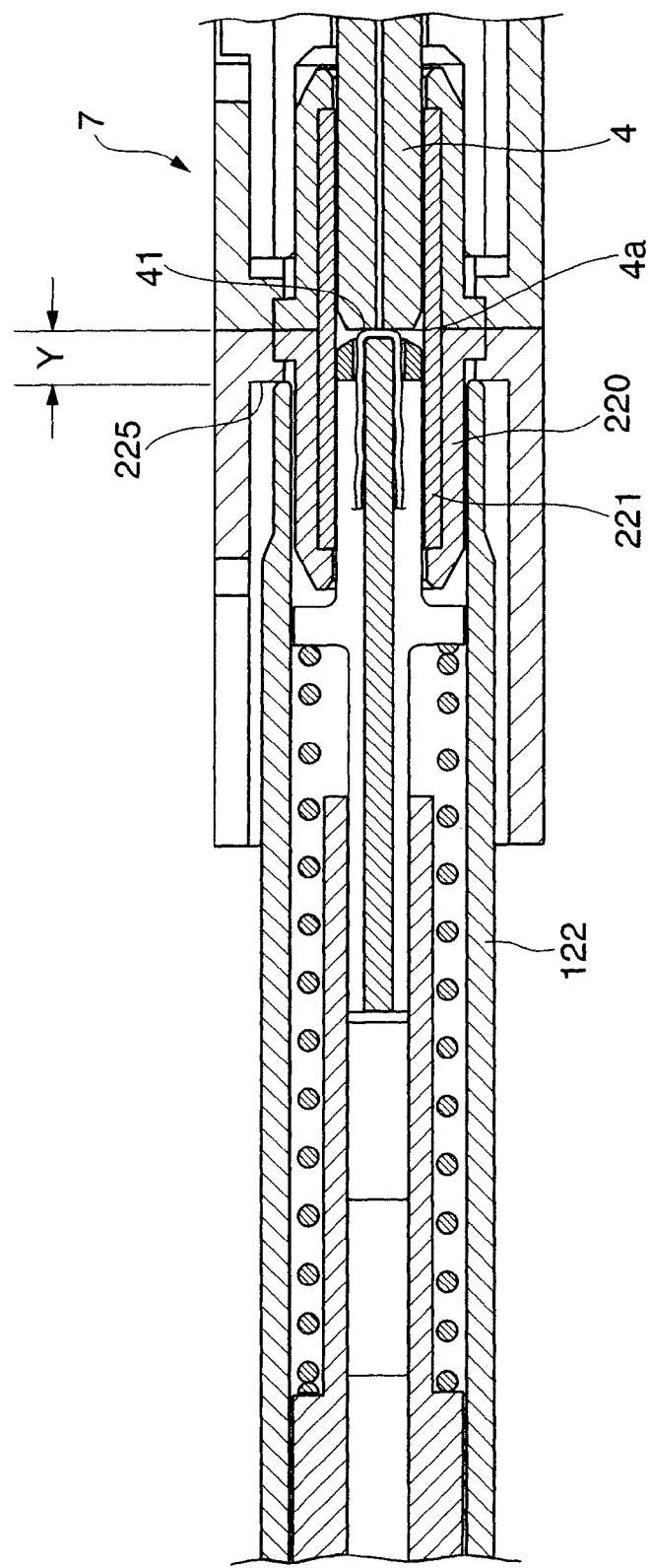
FIG. 23 is a sectional view showing a state in which a guide member is abutted against the inner wall of the receptacle.

FIG. 22 shows a state in which the distal end portion of the optical connector cleaning tool 100 is inserted halfway into the receptacle 7. When an operator gradually inserts the distal end portion of the optical connector cleaning tool 100 into the receptacle 7 by holding the slider 10, the distal end of the guide member 122 enters the gap between the sleeve holder 220 and locking pieces 224 while elastically deforming the locking pieces 224 outward. When a predetermined amount of the distal end portion of the optical connector cleaning tool 100 is inserted into the receptacle 7, the distal end of the guide member 122 abuts against the inner wall 225 of the receptacle 7 and stops (FIG. 22). When the optical connector cleaning tool 100 is further pushed into the receptacle 7, the guide biasing spring 123 is gradually compressed, and the rotary pod 40 moves forward to bring the distal end of the cleaning pin 44 into contact with the ferrule end face 4a. FIG. 23 shows this state. In this state, the guide member 122 is relatively behind the cleaning pin 44 by 0.8 mm (the initial cleaning pin withdrawal amount from the guide member distal end)+Y mm owing to the contraction of the guide biasing spring 123. Note that Y (FIG. 23) is the distance between the inner wall 225 of the receptacle 7 and the ferrule end face 4a and, e.g., 1.3 mm.

Figure 24:
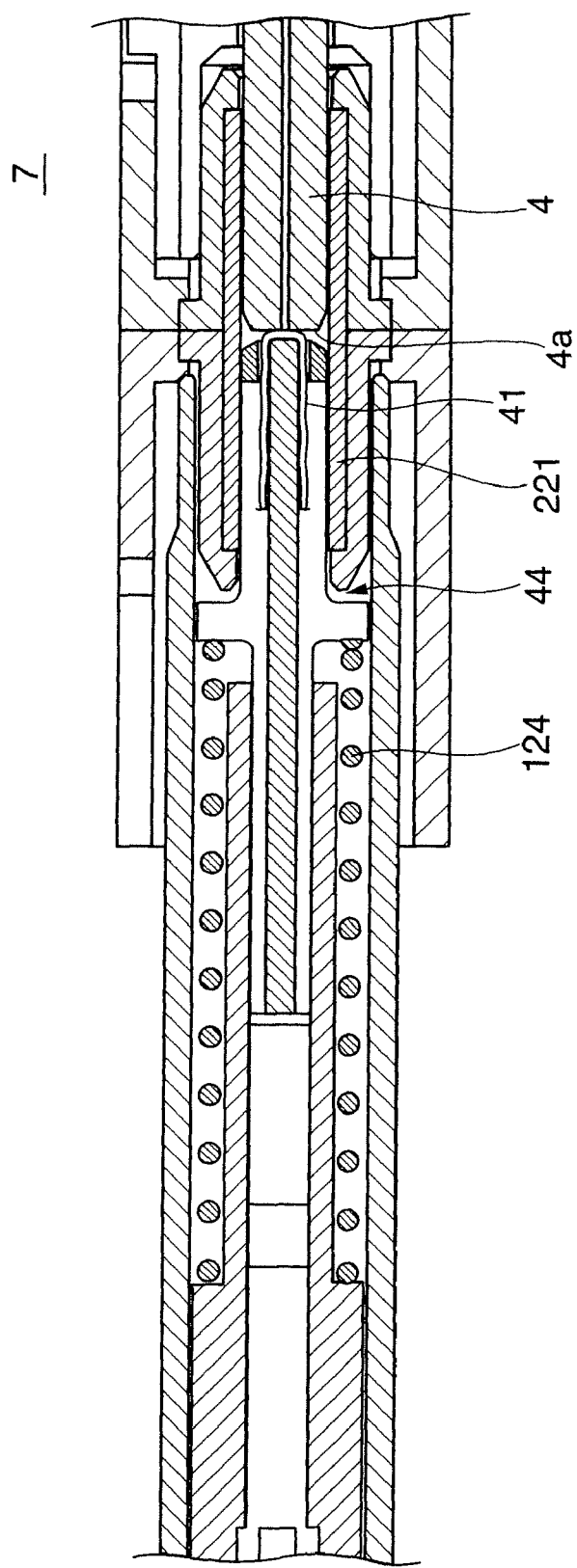
FIG. 24 is a sectional view showing a state in which the guide member is further pressed against the inner wall of the receptacle.

FIG. 24 shows a state in which the optical connector cleaning tool 100 is further pushed into the receptacle 7 to relatively retreat the guide member 122 by 5 mm (a maximum amount by which the guide member can retreat from the rotary pod 40)−2.1 mm=2.9 mm. Consequently, the cleaning pin 44 also retreats 2.9 mm from the rotary pod 40, and the pin biasing spring 124 contracts 2.9 mm. When the guide member 122 retreats the maximum distance, its rear end abuts against the front surface of the main body 40A of the rotary pod 40 and stops, and the guide member 122 is completely connected to the rotary pod 40. In this state, the guide biasing spring 123 has reached its limit, i.e., cannot be compressed any more because the deformation amount has become maximum and adjacent coils are in tight contact with each other. On the other hand, the pin biasing spring 124 has not reached its limit yet, and keeps pressing the cleaning pin 44 against the end face 4a of the ferrule 4 by a predetermined pressing force.

When the guide member 122 is further pressed against the sidewall 225 of the receptacle 7, the guide biasing spring 123 is not compressed because it has already reached its limit, and the slider 10 starts advancing against the slider return spring 13. That is, the slider return spring 13 in a compressed state is incorporated into the slider 10 in the initial state. Therefore, the slider return spring 13 does not contract unless the force with which the distal end of the guide member 122 pushes the inner wall 225 of the receptacle 7 exceeds the restoration force of the slider return spring 13. Since the pushing force of the distal end of the cleaning pin 44 has become a predetermined load before this restoration force is reached, the slider return spring 13 does not start contacting against its restoration force unless the distal end of the cleaning pin 44 is set in a state suited for cleaning. Accordingly, the slider 10 starts advancing toward the body 12, and the guide projections 17 advance along the spiral grooves 25 and 26, thereby rotating the body 12. Consequently, the rotary pod 40, guide member 122, and cleaning pin 44 rotate together with the body 12, and the cleaning thread 41 cleans the ferrule end face 4a. Therefore, no part of the ferrule end face 4a remains unwiped, so the whole of the ferrule end face 4a can reliably be cleaned. That is, if the guide member 122, cleaning pin 44, and biasing springs 13, 123, and 124 do not operate as described above and the cleaning pin 44 starts rotating before it abuts against the ferrule end face 4a, the cleaning thread 41 cleans the ferrule end face 4a at an angle of 180° or less, and pieces an unwiped portion behind. In the above-mentioned structure, however, the body 12, rotary pod 40, cleaning pin 44, and the like can be rotated after the cleaning pin 44 comes in contact with the ferrule end face 4a. Since this eliminates the above-mentioned phenomenon in which an unwiped portion remains, the whole of the ferrule end face 4a can reliably be cleaned.

As described above, the optical connector cleaning tool 100 according to this embodiment achieves the following effects because it includes the guide portion 101.

(1) Except when performing cleaning, the guide portion 101 protects the cleaning pin 44 by positioning it inside the guide member 122. This makes it possible to prevent an accident in which the cleaning pin 44 hits against something and breaks except when performing cleaning.

(2) The guide biasing spring 123 biases the guide member 122 forward. After the distal end of the guide member 122 is urged against the inner wall 225 of the receptacle 7, therefore, the body 12, rotary pod 40, and cleaning pin 44 relatively move forward, so the cleaning pin 44 can reliably be inserted into the sleeve 221.

(3) The outer diameter of the distal end portion of the guide member 122 is set to an optimum dimension corresponding to the internal shape of the receptacle 7. When inserting the guide member 122 into the receptacle 7, therefore, the distal end of the guide member 122 is naturally guided and inserted into the receptacle 7 without accurately aiming at the center of the ferrule 4. This makes it possible to reliably bring the cleaning pin 44 into contact with the ferrule end face 4a without operator's awareness.

Figure 25:
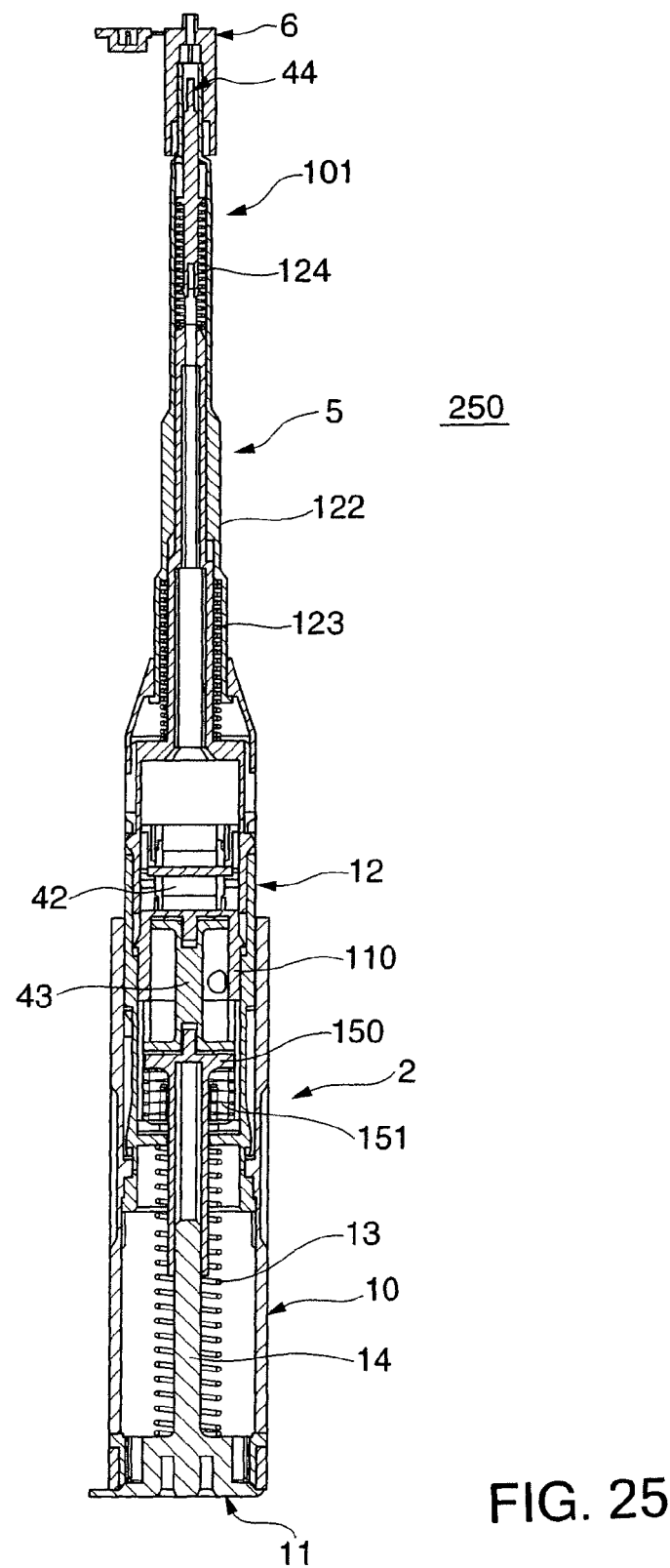
FIG. 25 is a sectional view of an optical connector cleaning tool according to the third embodiment of the present invention.

FIG. 25 shows an optical connector cleaning tool 250 according to the third embodiment of the present invention. The optical connector cleaning tool 250 is applied to MU and LC type optical connectors (ferrule diameter=1.25 mm). Big structural differences from the optical connector cleaning tool 100 disclosed in the second embodiment described above are the differences between the SC or FC type optical connector and the MU or LC type optical connector, i.e., the differences in receptacle opening shape, ferrule diameter, and distance Y between the receptacle inner wall and the ferrule distal end. Therefore, the differences are the distal end shape of a cleaner 5, the dimension of insertion into a receptacle, the outer diameter of a thread support surface S of a cleaning pin 44, the distal end shape of a guide member 122, and the like. The rest of the structure is almost the same as that of the above-mentioned optical connector cleaning tool 100 for the SC and FC type optical connectors. Accordingly, a holder 2 is used as a common part for all types of connectors, and cleaners 5 are prepared for the and FC type connectors and the MU and LC type connectors. A cleaner 5 corresponding to an optical connector 3 to be cleaned need only be selected and attached to the holder 2.

More specifically, the opening shape of a receptacle 7 and the distance Y between an inner wall 225 (FIG. 20) of the receptacle 7 and the ferrule distal end change in accordance with the type of optical connector. This makes the distal end shape and length of the guide member 122 for the SC and FC optical connectors different from those for the MU and LC optical connectors.

It is necessary to meet various opening shapes of the receptacles 7. For a ferrule diameter of 2.5 mm, therefore, the distal end of the guide member 122 has an outer diameter having a dimension that allows insertion into the receptacles 7 of both the SC and FC type optical connectors, and an inner diameter larger than the outer diameter of a sleeve holder 220, so both the optical connectors can be cleaned. Also, with respect to the opening of the receptacle 7 of particularly the type optical connector, the distal end of the optical connector cleaning tool 250 is naturally guided by locking pieces 224 without accurately aiming at the center, and the guide member 122 is smoothly inserted into the receptacle 7, so the cleaning pin 44 is inserted into a sleeve 221 without operator's awareness. Note that the outer diameter of the cleaning pin 44 is slighter smaller than 2.5 mm as the inner diameter of the sleeve 221. More specifically, the cleaning pin 44 has a distal end portion (length=about 4 mm) having a diameter of 5.9 mm corresponding to the FC type optical connector, and a rear end having a diameter of 6.4 mm that stabilizes insertion into the SC type optical connector. The guide member 122 has an inner diameter of 4.9 mm corresponding to the SC type optical connector in which the sleeve holder 220 has a large outer diameter.

This similarly applies to an optical connector cleaning tool for a ferrule diameter of 1.25 mm. That is, the optical connector cleaning tool can clean both the MU and LC type optical connectors and can readily be inserted into the receptacle 7, so the cleaning pin 44 can be inserted into the sleeve 221 without operator's awareness. Note that the outer diameter of the cleaning pin 44 is slightly smaller than 1.25 mm as the inner diameter of the sleeve 221. More specifically, since the cleaning pin 44 for the LC type connector has a large flange range depth, a portion about 15 mm long of the distal end portion of the guide member 122 has an outer diameter of 4.3 mm. Therefore, the optical connector cleaning tool for a diameter of 1.25 mm is longer by about 13 mm (accurately, 13.35 mm) than that for a diameter of 2.5 mm. This makes it possible to make the positions of the flanges 140 the same in the cleaning pins 44 for the ferrule having a diameter of 2.5 mm and that having a diameter of 1.25 mm, and make the lengths of the spring accommodating spaces between rotary pods 40 and the guide members 122 the same. As a consequence, the same pin biasing spring 214 can be used.

The values of the distance Y between the receptacle inner wall and ferrule end face are respectively 1.3, 3.7, 1.35, and 0.65 mm for the SC, FC, MU, and LC type connectors. Also, the values of the contraction amount of a guide biasing spring 123 are respectively 2.9 mm (=5−0.8−1.3), 0.5 mm (=5−0.8−3.7), 1.1 mm (=5−2.55−1.35), and 1.8 mm (=5−2.55−0.65) for the SC, FC, MU, and LC type connectors. Note that the distance Y between the receptacle inner wall and ferrule end face largely changes from one optical connector to another, but no problem arises because the guide return spring 123 always contracts (at least 0.5 mm) and applies a pressing force.

The above features make it possible to use the identical parts and reduce the cost. That is, it is only necessary to prepare the cleaning pins 44 and guide members 122 for the ferrule having a diameter of 2.5 mm and that having a diameter of 1.25 mm in accordance with the types of optical connectors, and selectively use them for the ferrule having a diameter of 2.5 mm and that having a diameter of 1.25 mm while using the identical parts including the guide biasing spring 123 and pin biasing spring 124 as the rest of the members.

Figure 26:
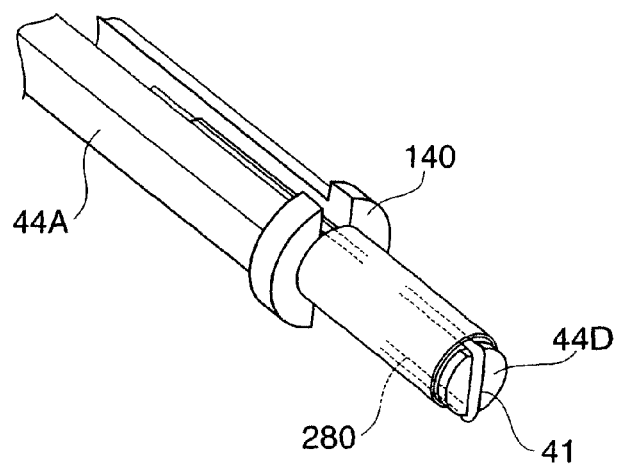
FIG. 26 is a perspective view of the main parts of a cleaning pin according to the fourth embodiment of the present invention.
Figure 27:
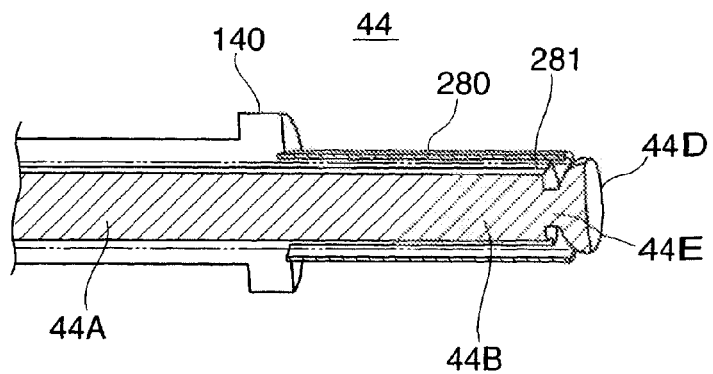
FIG. 27 is a sectional view of the main parts of the cleaning pin.
Figure 28:
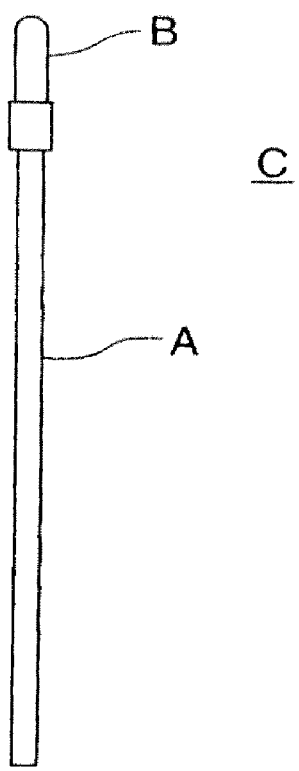
FIG. 28 is a view showing a conventional example of a stick type cleaning tool.

FIG. 26 is a perspective view of the main parts of a cleaning pin according to the fourth embodiment of the present invention. FIG. 27 is a sectional view of the main parts of the cleaning pin. In this embodiment, a head 44D is integrally formed at the distal end of a thread support portion 44B of a cleaning pin 44. The head 44D has a front surface that forms a flat thread support surface, and is connected to the thread support portion 44B with a neck 44E being formed between them. The neck 44E is elastically deformable and hence can tilt the head 44D in all directions. Also, an outer cylinder 280 made of another member is fitted on the outer circumferential surface of the thread support portion 44B, and an annular gap between the outer cylinder 280 and thread support portion 44B forms a thread passage 281 into which a cleaning thread 41 is to be inserted.

When using the cleaning pin 44 as described above, the head 44D inclines while ensuring a large contact length between the cleaning thread 41 and a ferrule 4. This makes it possible to reliably clean a ferrule having a ferrule end face that is neither a flat surface nor a spherical surface, e.g., an oblique contact type ferrule as shown in FIG. 15. In addition, it is only necessary to guide the cleaning thread 41 forward along the outer circumferential surface of the thread support portion 44B, extend the cleaning thread 41 across the front surface of the head 44D, and then attach the outer cylinder 280 to the thread support portion 44B. This obviates the need to form the thread extracting hole 144 and thread introducing hole 145 shown in FIG. 14 in the thread support portion 44B, and facilitates attaching the cleaning thread 41 to the cleaning pin 44.

INDUSTRIAL APPLICABILITY

The optical connector cleaning tool according to the present invention can be used for both the female connector 3 and male connector 90.

The invention claimed is:

1. An optical connector cleaning tool comprising a holder, and a cleaner which is rotatably attached to said holder and cleans a connection surface of an optical connector by a cleaning thread,
    said holder including a cylindrical slider including an elastic piece having a guide projection on a circumferential wall, a cylindrical body having, in an outer circumferential surface, a spiral groove with which said guide projection engages, and installed in said slider such that said cylindrical body is rotatable and movable forward and backward, a slider return spring which returns said slider to an initial position, and a shaft accommodated in said slider,
    said cleaner including a rotary pod connected to said body, a supply reel around which said cleaning thread is wound, a take-up reel which has one end connected to said shaft and takes up a used cleaning thread, and a cleaning pin which brings said cleaning thread into contact with the connection surface of the optical connector, and
    said cleaning pin including a thread support portion having, on a distal end face, a thread support surface which supports said cleaning thread, and protruding from said rotary pod,
    wherein said rotary pod gives tension to said cleaning thread by rotating together with said body during cleaning, thereby supplying an unused cleaning thread from said supply reel, and taking up a used cleaning thread to said take-up reel.

2. An optical connector cleaning tool according to claim 1, wherein said cleaner is attached to said holder such that said cleaner is replaceable.

3. An optical connector cleaning tool according to claim 1, wherein said slider moves forward against said slider return spring during cleaning while said cleaning thread is in contact with the connection surface of the optical connector, thereby integrally rotating said body, said rotary pod, and said cleaning pin.

4. An optical connector cleaning tool according to claim 1, wherein said take-up reel rotatably axially supports said supply reel and said cleaning pin.

5. An optical connector cleaning tool according to claim 1, wherein
    said cleaning pin includes a thread supporting groove formed in the distal end face of said thread support portion, and a thread feedout slit and a thread feedin slit formed in an outer circumferential surface, and
    said cleaning thread is fed outside said cleaning pin from inside said cleaning pin through said thread feedout slit, engaged with said thread supporting groove, and fed into said cleaning pin again through said thread introducing groove.

6. An optical connector cleaning tool according to claim 1, wherein said cleaner further includes a thread swinging member which swings, in an axial direction of said take-up reel, a used cleaning thread to be taken up to said take-up reel, and said thread swinging member includes a supply-reel-side hole into which a cleaning thread supplied from said supply reel is to be inserted, and a take-up-reel-side hole into which a used cleaning thread is to be inserted, and is accommodated in a guide hole formed in said cleaner such that said thread swinging member is slidable in an axial direction of said body.

7. An optical connector cleaning tool according to claim 6, wherein said thread swinging member is made of a transparent material, and makes said supply reel visually checkable from outside said cleaner.

8. An optical connector cleaning tool according to claim 6, wherein said rotary pod further includes a thread insertion hole into which a used cleaning thread is to be inserted, and the used cleaning thread is inserted into the take-up-reel-side hole of said thread swinging member through the thread insertion hole.

9. An optical connector cleaning tool according to claim 1, wherein said cleaner further includes a cap which is detachably attached to a distal end of said rotary pod and protects a distal end portion of said cleaning pin, and said cap includes a hole into which a distal end portion of an optical fiber of a male optical connector is to be inserted, and a lid which closes the hole.

10. An optical connector cleaning tool according to claim 1, wherein said cleaner further includes a guide portion which guides said cleaning pin to a receptacle of a female optical connector, said guide portion includes a guide member fitted on an outer circumferential surface of said rotary pod such that said guide member is movable forward and backward, and having a front end normally positioned before said rotary pod, and a guide member biasing spring which biases said guide member forward, and said cleaning pin is installed to be movable forward and backward in said rotary pod, and, when said cleaning pin is biased forward by a pin biasing spring, said thread support portion protrudes from said rotary pod and is normally positioned in a distal end portion of said guide member.

11. An optical connector cleaning tool according to claim 1, wherein said cleaner further includes a read slack preventing mechanism which prevents a slack of said cleaning thread, and said thread slack preventing mechanism includes a reel accommodating member which rotatably accommodates said take-up reel and said supply reel and rotates together with said body, a latch mechanism which inhibits idling of said supply reel, a first unidirectional clutch which transmits rotation of said reel accommodating member to said take-up reel when said slide moves forward, and a second unidirectional clutch which transmits rotation of said reel accommodating member to said take-up reel when said slider moves backward.

12. An optical connector cleaning tool according to claim 11, wherein an axis of said supply reel is perpendicular to an axis of said take-up reel.

13. An optical connector cleaning tool according to claim 1, wherein said cleaning pin has a tapered surface around the thread support surface.

14. An optical connector cleaning tool according to claim 1, wherein said cleaning pin further includes an outer cylinder fitted on an outer circumferential surface of said thread support portion, and a gap between said thread support portion and said outer cylinder forms a thread passage.

15. An optical connector cleaning tool according to claim 14, wherein said thread support portion of said cleaning pin further includes, at a distal end, a head configured to tilt in all directions, and a front surface of said head forms the thread support surface.

16. An optical connector cleaning tool according to claim 1, wherein said body further includes a straight groove formed parallel to the axis in an outer circumferential surface and connecting a start end and terminal end of said spiral groove.

\* \* \* \* \*